(12) United States Patent
Kimn et al.

(10) Patent No.: US 10,728,222 B2
(45) Date of Patent: Jul. 28, 2020

(54) SYSTEM AND METHOD FOR PROVIDING VEHICLE INFORMATION BASED ON PERSONAL AUTHENTICATION AND VEHICLE AUTHENTICATION

(71) Applicant: SAMSUNG ELECTRONICS CO., LTD., Suwon-si, Gyeonggi-do (KR)

(72) Inventors: Soungkwan Kimn, Pyeongtaek-si (KR); Amol Mahadev Gandigude, Yongin-si (KR); Wonchang Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 197 days.

(21) Appl. No.: 15/612,235

(22) Filed: Jun. 2, 2017

(65) Prior Publication Data
US 2018/0026949 A1  Jan. 25, 2018

(30) Foreign Application Priority Data

Jul. 21, 2016 (KR) .......................... 10-2016-0092942

(51) Int. Cl.
*H04L 29/06* (2006.01)
*H04L 9/08* (2006.01)
(Continued)

(52) U.S. Cl.
CPC .......... *H04L 63/0428* (2013.01); *H04L 9/083* (2013.01); *H04L 9/0822* (2013.01);
(Continued)

(58) Field of Classification Search
CPC . H04L 63/0428; H04L 9/0822; H04L 9/0827; H04L 9/083; H04L 9/3247;
(Continued)

(56) References Cited

U.S. PATENT DOCUMENTS 6,064,970 A    5/2000  McMillan et al.
8,406,988 B2   3/2013  Schäfer et al.
(Continued)

FOREIGN PATENT DOCUMENTS

KR    10-1269086      5/2013
KR    10-2015-0053859  5/2015

*Primary Examiner* — Techane Gergiso
(74) *Attorney, Agent, or Firm* — Nixon & Vanderhye P.C.

(57) ABSTRACT

An electronic device and method for providing vehicle information based on personal authentication and vehicle authentication are disclosed. According to various example embodiments, an electronic device includes a communication module comprising communication circuitry configured to communicate with a vehicle device and a first server and a processor electrically connected with the communication module, in which the processor is configured to receive an encrypted session key set including at least one session key from the first server, to transmit the encrypted session key set to the vehicle device, receive, from the vehicle device, second vehicle information in which first vehicle information of the vehicle device is encrypted using a first session key of the at least one session key and is signed using a secret key of the vehicle device, and to transmit, to the first server, third vehicle information in which the received second vehicle information is signed using a secret key of a user.

18 Claims, 20 Drawing Sheets

(51) Int. Cl.
 *H04L 9/32*    (2006.01)
 *H04W 12/06*   (2009.01)
 *H04W 12/04*   (2009.01)
 *H04W 12/08*   (2009.01)

(52) U.S. Cl.
 CPC .......... *H04L 9/0827* (2013.01); *H04L 9/3247* (2013.01); *H04L 9/3268* (2013.01); *H04L 63/0807* (2013.01); *H04L 63/0823* (2013.01); *H04W 12/04* (2013.01); *H04W 12/06* (2013.01); *H04W 12/08* (2013.01); *H04L 2209/80* (2013.01); *H04L 2209/84* (2013.01); *H04L 2463/062* (2013.01)

(58) Field of Classification Search
 CPC ............... H04L 9/3268; H04L 63/0807; H04L 63/0823; H04L 2209/80; H04L 2209/84; H04L 2463/062; H04W 12/04; H04W 12/06; H04W 12/08
 See application file for complete search history.

(56) References Cited

U.S. PATENT DOCUMENTS

| | | | | |
|---|---|---|---|---|
| 9,164,957 | B2 | 10/2015 | Hassib et al. | |
| 2003/0073406 | A1* | 4/2003 | Benjamin | G08G 1/0962 455/41.1 |
| 2003/0147534 | A1* | 8/2003 | Ablay | H04L 9/3271 380/270 |
| 2004/0078338 | A1* | 4/2004 | Ohta | G06F 21/10 705/51 |
| 2004/0093523 | A1* | 5/2004 | Matsuzaki | G06F 21/10 726/10 |
| 2004/0103303 | A1* | 5/2004 | Yamauchi | G06F 21/10 726/33 |
| 2009/0132813 | A1* | 5/2009 | Schibuk | G06Q 20/223 713/158 |
| 2012/0159170 | A1* | 6/2012 | Lee | H04W 12/02 713/169 |
| 2013/0083926 | A1* | 4/2013 | Hughes | H04L 9/0836 380/278 |
| 2014/0169564 | A1* | 6/2014 | Gautama | G07C 9/00309 380/270 |
| 2014/0237256 | A1* | 8/2014 | Ben Ayed | H04W 12/04 713/186 |
| 2015/0052352 | A1* | 2/2015 | Dolev | H04W 12/06 713/156 |
| 2015/0121071 | A1* | 4/2015 | Schwarz | H04L 63/12 713/168 |
| 2015/0134368 | A1 | 5/2015 | Lee | |
| 2015/0329005 | A1* | 11/2015 | Oishi | G01C 21/32 701/22 |
| 2016/0012653 | A1* | 1/2016 | Soroko | G07C 5/008 340/5.61 |
| 2016/0035147 | A1* | 2/2016 | Huang | H04L 9/0869 701/31.4 |
| 2016/0072781 | A1* | 3/2016 | Zhang | H04L 63/065 726/4 |
| 2016/0219029 | A1* | 7/2016 | Oshida | H04L 67/1095 |
| 2017/0171178 | A1* | 6/2017 | Reynders | H04W 12/06 |
| 2017/0257345 | A1* | 9/2017 | Westra | H04L 63/029 |

\* cited by examiner

SYSTEM AND METHOD FOR PROVIDING VEHICLE INFORMATION BASED ON PERSONAL AUTHENTICATION AND VEHICLE AUTHENTICATION

CROSS-REFERENCE TO RELATED APPLICATION

This application is based on and claims priority under 35 U.S.C. § 119 to a Korean patent application filed in the Korean Intellectual Property Office on Jul. 21, 2016 and assigned Ser. No. 10-2016-0092942, the disclosure of which is incorporated by reference herein in its entirety.

TECHNICAL FIELD

The present disclosure relates generally to an apparatus and method for providing vehicle information.

BACKGROUND

Generally, a technique for connecting a vehicle with an electronic device (e.g., a smartphone) allows a user to use a function of the electronic device connected with the vehicle in the vehicle or a function of the vehicle in the electronic device. For example, service information of the vehicle may be displayed on a display of the electronic device or service information of the electronic device may be displayed on a display of the vehicle. Such a technique may be applied to various services such as MirroLink, Android Auto, CarPlay, Smart Device Link, etc.

As performance of electronic devices has improved recently, there is a need for a method for providing vehicle information to an external device through an electronic device connected with a vehicle.

The above information is presented as background information only to assist with an understanding of the present disclosure.

SUMMARY

Various example embodiments of the present disclosure provide an electronic device and method for safely providing vehicle information based on personal authentication and vehicle authentication.

Various example embodiments of the present disclosure also provide an apparatus and method for providing vehicle information.

According to various example embodiments, an electronic device includes a communication module comprising communication circuitry connected to a vehicle device and a first server and a processor electrically connected with the communication module, wherein the processor is configured to receive an encrypted session key set including at least one session key from the first server, to transmit the encrypted session key set to the vehicle device, to receive, from the vehicle device, second vehicle information in which first vehicle information of the vehicle device is encrypted using a first session key of the at least one session keys and is signed using a secret key of the vehicle device, and to transmit, to the first server, third vehicle information in which the received second vehicle information is signed using a secret key of a user.

According to various example embodiments, a storage medium is provided having stored therein instructions which, when executed by at least one processor, cause the at least one processor to perform at least one operation comprising connecting an electronic device to a vehicle device and a first server, receiving an encrypted session key set including at least one session key from the first server, transmitting the encrypted session key set to the vehicle device, receiving, from the vehicle device, second vehicle information in which first vehicle information of the vehicle device is encrypted using a first session key of the at least one session keys and is signed using a secret key of the vehicle device, and transmitting, to the first server, third vehicle information in which the received second vehicle information is signed using a secret key of a user.

According to various example embodiments, a method for operating an electronic device includes connecting the electronic device to a vehicle device and a first server, receiving an encrypted session key set including at least one session key from the first server, transmitting the encrypted session key set to the vehicle device, receiving, from the vehicle device, second vehicle information in which first vehicle information of the vehicle device is encrypted using a first session key of the at least one session keys and is signed using a secret key of the vehicle device, and transmitting, to the first server, third vehicle information in which the received second vehicle information is signed using a secret key of a user.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and attendant advantages of the present disclosure will be more apparent and readily appreciated from the following detailed description, taken in conjunction with the accompanying drawings, in which like reference numerals refer to like elements, and wherein.

Throughout the drawings, like reference numerals will be understood to refer to like parts, components, and structures.

DETAILED DESCRIPTION

Figure 1:
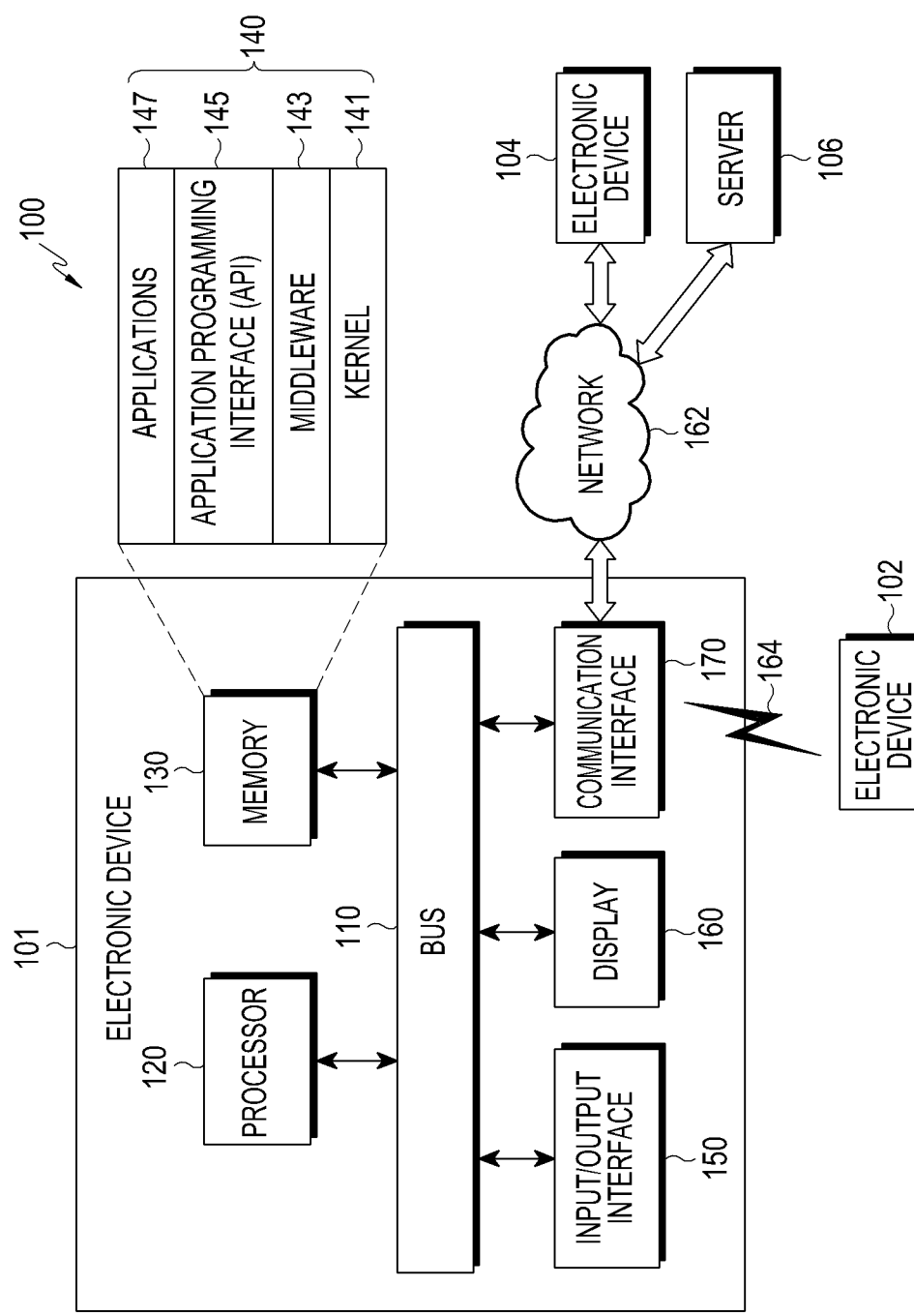
FIG. 1 is a diagram illustrating an example network environment including an electronic device according to various example embodiments of the present disclosure.

Hereinafter, various example embodiments of the present disclosure will be disclosed with reference to the accompanying drawings. However, embodiments and terms used therein are not intended to limit the present disclosure to particular embodiments, and it should be construed as including various modifications, equivalents, or alternatives according to the embodiments of the present disclosure. In regard to the description of the drawings, like reference numerals refer to like elements. The singular forms are intended to include the plural forms as well, unless the context clearly indicates otherwise. In the present disclosure, an expression such as "A or B," "at least one of A or/and B," or "one or more of A or/and B" may include all possible combinations of together listed items. Expressions such as "first," "second," "primarily," or "secondary," used herein may represent various elements regardless of order or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may refer to a situation in which the apparatus "can" operate together with another apparatus or component. For example, a phrase "a processor configured (or set) to perform A, B, and C" may refer, for example, to a dedicated processor (e.g., an embedded processor) for performing a corresponding operation or a generic-purpose processor (such as a central processing unit (CPU) or an application processor) that can perform a corresponding operation by executing at least one software program stored at a memory device.

An electronic device according to various embodiments of the present disclosure may include at least one of, for example, a smartphone, a tablet personal computer (PC), a mobile phone, a video phone, an electronic-book (e-book) reader, a desktop PC, a laptop PC, a netbook computer, a workstation, a server, a personal digital assistant (PDA), a portable multimedia player (PMP), an MP3 player, a mobile medical equipment, a camera, and a wearable device, or the like, but is not limited thereto. Examples of the wearable device may include at least one of an accessory type (e.g., a watch, a ring, a bracelet, an anklet, a necklace, glasses, contact lenses, head-mounted device (HMD), etc.), a fabric or cloth-integrated type (e.g., electronic clothing, etc.), a body-attached type (e.g., a skin pad, a tattoo, etc.), a body implanted type (e.g., an implantable circuit, etc.), or the like, but is not limited thereto. In some embodiments, the electronic device may include, for example, a television (TV), a Digital Video Disk (DVD) player, audio equipment, a refrigerator, an air conditioner, a vacuum cleaner, an oven, a microwave oven, a laundry machine, an air cleaner, a set-top box, a home automation control panel, a security control panel, a TV box (e.g., HomeSync™ of Samsung, AppleTV™ of Apple, or GoogleTV™ of Google), a game console, an electronic dictionary, an electronic key, a camcorder, and an electronic frame, or the like, but is not limited thereto.

In other embodiments, the electronic device may include at least one of various medical equipment (for example, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and gyro compass for ships), avionics, a security device, a vehicle head unit, an industrial or home robot, an automatic teller's machine (ATM), a Point of Sales (POS), Internet of things (e.g., electric bulbs, various sensors, electricity or gas meters, sprinkler devices, fire alarm devices, thermostats, streetlights, toasters, exercise machines, hot-water tanks, heaters, boilers, and so forth), or the like, but is not limited thereto. According to some embodiments, the electronic device may include a part of a furniture, building/structure or a part of a vehicle, an electronic board, an electronic signature receiving device, a projector, and various measuring instruments (e.g., a water, electricity, gas, electric wave measuring device, etc.), or the like, but is not limited thereto. According to various embodiments, the electronic device may be flexible or may be a combination of two or more of the above-described various devices. The electronic device according to an embodiment of the present disclosure is not limited to the aforementioned devices. Herein, the term "user" used in various embodiments of the present disclosure may refer to a person who uses the electronic device or a device using the electronic device.

Referring to FIG. 1, an electronic device 101 in a network environment 100 according to various example embodiments of the present disclosure is disclosed. The electronic device 101 may include a bus 110, a processor (e.g., including processing circuitry) 120, a memory 130, an input/output (I/O) interface (e.g., including interface circuitry) 150, a display 160, and a communication interface (e.g., including communication circuitry) 170. According to some embodiments, the electronic device 101 may omit at least one of the foregoing elements or may further include other elements.

The bus 110 may include a circuit for connecting, e.g., the elements 110 to 170 and transmitting communication (e.g., a control message or data) between the elements 110 to 170.

The processor 120 may include various processing circuitry, such as, for example, and without limitation, one or more of a dedicated processor, a central processing unit (CPU), an application processor (AP), and a communication processor (CP). The processor 120 performs operations or data processing for control or communication of, for example, at least one other elements of the electronic device 101.

According to an embodiment, the processor 120 may be connected to an external device (e.g., a vehicle device 102, an electronic device 104, or a server 106). For example, the server 106 may be an authentication server that issues a certificate of authentication or a data server that receives vehicle information. The server 106 may be implemented with one or more authentication servers and one or more data servers.

The processor 102 receives a session key set including at least one encrypted session key from the server 106 and transmits the encrypted session key set to the vehicle device 102. The processor 120 receives, from the vehicle device 102, second vehicle information in which first vehicle information obtained by the vehicle device 102 is encrypted using a first session key among at least one session keys and is signed using a secret key of the vehicle device 102. The processor 120 transmits third vehicle information in which the second vehicle information is signed using a secret key of a user (e.g., a user of the electronic device 101 or a driver of the vehicle device 102) to an external device.

According to various embodiments, the processor 102 receives feedback information (e.g., service information (e.g., an insurance discount rate, etc.) related to the first vehicle information) about the first vehicle information from the server 106 and stores the received feedback information in the memory 130 or displays the received feedback information on the display 160.

The memory 130 may include a volatile or nonvolatile memory. The memory 130 may store, for example, instructions or data associated with at least one other elements of the electronic device 101.

According to an embodiment of the present disclosure, the memory 130 may store software or a program 140. The program 140 may include at least one of, for example, a kernel 141, middleware 143, an application programming interface (API) 145, or an application program (or "application") 147, and the like. At least some of the kernel 141, the middleware 143, and the API 145 may be referred to as an operating system (OS).

The kernel 141 may control or manage, for example, system resources (e.g., the bus 110, the processor 120, the memory 130, etc.) used to execute operations or functions implemented in other programs (e.g., the middleware 143, the API 145, or the application program 147). The kernel 141 provides an interface through which the middleware 143, the API 145, or the application program 147 accesses separate components of the electronic device 101 to control or manage the system resources.

The middleware 143 may work as an intermediary for allowing, for example, the API 145 or the application program 147 to exchange data in communication with the kernel 141. In addition, the middleware 143 may process one or more task requests received from the application program 147 based on priorities. For example, the middleware 143 may give a priority for using a system resource (e.g., the bus 110, the processor 120, the memory 130, etc.) of the electronic device 101 to at least one of the application programs 147, and may process the one or more task requests. The API 145 is an interface used for the application 147 to control a function provided by the kernel 141 or the middleware 143, and may include, for example, at least one interface or function (e.g., an instruction) for file control, window control, image processing or character control. The I/O interface 150 may transmit, for example, an instruction or data input from a user or another external device to other component(s) of the electronic device 101, or output an instruction or data received from other component(s) of the electronic 101 to a user or another external device.

The display 160 may include, for example, a liquid crystal display (LCD), a light emitting diode (LED) display, an organic light emitting diode (OLED) display, a microelectromechanical system (MEMS) display, or an electronic paper display, or the like, but is not limited thereto. The display 160 may, for example, display various contents (e.g., a text, an image, video, an icon, or a symbol, etc.) to users. The display 160 may include a touch screen, and receives a touch, a gesture, proximity, a drag, a swipe, or a hovering input, for example, by using an electronic pen or a part of a body of a user.

The communication interface 170 may include various communication circuitry and establishes communication between the electronic device 101 and an external device (e.g., the vehicle device 102, the electronic device 104, or the server 106). For example, the communication interface 170 may be connected to a network 162 through wireless communication or wired communication to communicate with an external device (e.g., the second external electronic device 104 or the server 106). Additionally, the communication interface 170 may be connected wirelessly to an electronic device 102 using short-range wireless communication 164.

The wireless communication may include cellular communication using at least one of Long Term Evolution (LTE), LTE-Advanced (LTE-A), Code Division Multiple Access (CDMA), Wideband CDMA (WCDMA), a Universal Mobile Telecommunication System (UMTS), Wireless Broadband (WiBro), or Global System for Mobile Communications (GSM)). According to an embodiment, the wireless communication may include at least one of Wireless Fidelity (WiFi), Bluetooth, Bluetooth Low Energy (BLE), ZigBee, near field communication (NFC), magnetic secure transmission (MST), radio frequency (RF), and a body area network (BAN). According to an embodiment, the wireless communication may include GNSS. The GNSS may include, for example, at least one of a global positioning system (GPS), a global navigation satellite system (Glonass), a Beidou navigation satellite system ("Beidou"), and Galileo, the European global satellite-based navigation system. Hereinbelow, "GPS" may be used interchangeably with "GNSS". The wired communication may include, for example, at least one of universal serial bus (USB), high definition multimedia interface (HDMI), recommended standard 232 (RS-232), power line communication, and plain old telephone service (POTS). The network 162 may include a telecommunications network, for example, at least one of a computer network (e.g., a local area network (LAN) or a wide area network (WAN)), Internet, and a telephone network.

According to an embodiment, an external device (e.g., the electronic device 104) may be a device of the same type as or a different type than the electronic device 101.

According to various embodiments of the present disclosure, some or all of operations performed by the electronic device 101 may be performed in another electronic device or a plurality of electronic devices (e.g., the electronic device 104 or the server 106).

Figure 2:
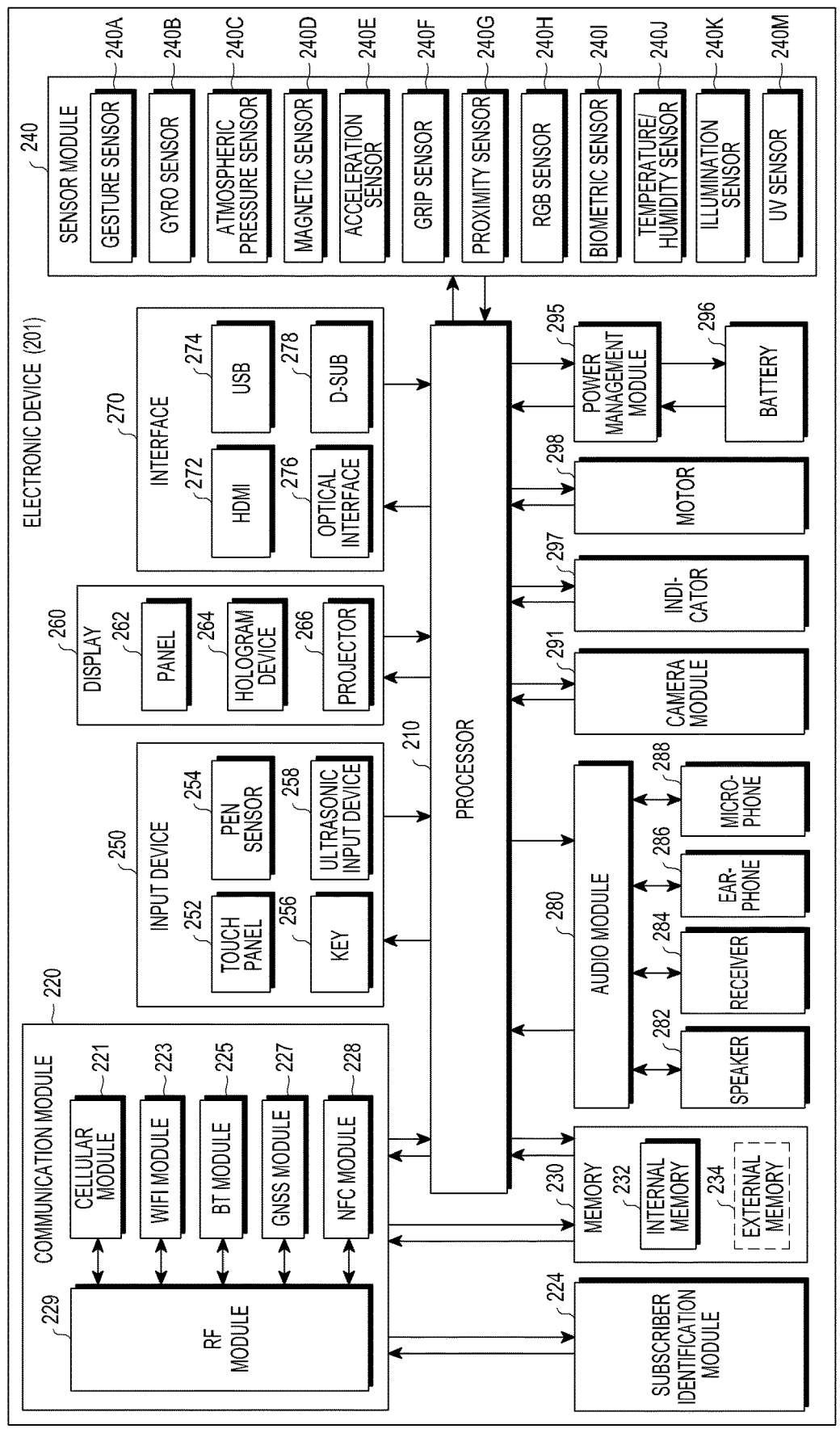
FIG. 2 is a block diagram illustrating an example electronic device according to various example embodiments of the present disclosure.

FIG. 2 is a block diagram illustrating an example electronic device 201 according to various embodiments of the present disclosure. The electronic device 201 may form the entire electronic device 101 illustrated in FIG. 2 or a part of the electronic device 101 illustrated in FIG. 1. The electronic device 201 may include one or more processors (e.g., application processors (APs)) (e.g., including processing circuitry) 210, a communication module (e.g., including communication circuitry) 220, a subscriber identification module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and controls multiple hardware or software components connected to the processor 210 by driving an Operating System (OS) or an application program, and performs processing and operations with respect to various data. The processor 210 may be implemented with, for example, a system on chip (SoC).

According to an embodiment of the present disclosure, the processor 210 may include a GPU or an image signal processor. The processor 210 may include at least some of the elements illustrated in FIG. 2 (e.g., the cellular module 221). The processor 210 loads an instruction or data received from at least one of other elements (e.g., a non-volatile memory) into a volatile memory to process the instruction or data, and stores result data in the non-volatile memory.

According to an embodiment, the processor 210 is connected to the vehicle device 102 or an external device (e.g., the electronic device 104 or the server 106), receives a session key set including at least one encrypted session key from the server 106, and transmits the encrypted session key set to the vehicle device 102. The processor 210 receives, from the vehicle device 102, second vehicle information in which first vehicle information obtained by the vehicle device 102 is encrypted using a first session key among at least one session keys and is signed using a secret key of the vehicle device 102. The processor 210 transmits the third vehicle information in which the second vehicle information is signed using the secret key of a user (e.g., the driver of the vehicle device 102), to an external device. The processor 210 receives feedback information (e.g., service information (e.g., an insurance discount rate, etc.) related to the first vehicle information) about the first vehicle information from the server 106 and stores the received feedback information in the memory 230 or displays the received feedback information on the display 260.

The communication module 220 may have a configuration that is the same as or similar to the communication interface 170. The communication module 220 may include various communication circuitry, such as, for example, and without limitation, the cellular module 221, a WiFi module 223, a Bluetooth (BT) module 225, a GNSS module 227, a near field communication (NFC) module 228, and a radio frequency (RF) module 229. The cellular module 221 may provide, for example, a voice call, a video call, a text service, or an Internet service over a communication network. According to an embodiment, the cellular module 221 identifies and authenticates the electronic device 201 in a communication network by using the SIM 224 (e.g., a SIM card). According to an embodiment, the cellular module 221 performs at least one of functions that may be provided by the processor 210. According to an embodiment, the cellular module 221 may include a communication processor (CP). According to some embodiment, at least some (e.g., two or more) of the cellular module 221, the WiFi module 223, the BT module 225, the GNSS module 227, and the NFC module 228 may be included in one integrated chip (IC) or IC package. The RF module 229 may, for example, transmit and receive a communication signal (e.g., an RF signal). The RF module 229 may include a transceiver, a power amp module (PAM), a frequency filter, a low noise amplifier (LNA), at least one antenna, or the like. According to another embodiment, at least one of the cellular module 221, the WiFi module 223, the BT module 225, the GNSS module 227, and the NFC module 228 may transmit and receive an RF signal through the separate RF module. The SIM 224 may, for example, include a card including an SIM or an embedded SIM, and may include unique identification information (e.g., an integrated circuit card identifier (ICCID) or subscriber information (e.g., an international mobile subscriber identity (IMSI)).

The memory 230 (e.g., the memory 130) may, for example, include an internal memory 232 or an external memory 234. The internal memory 232 may, for example, include at least one of a volatile memory (e.g., dynamic random access memory (DRAM), static RAM (SRAM), synchronous dynamic RAM (SDRAM), etc.), and a non-volatile memory (e.g., one time programmable read only memory (OTPROM), programmable ROM (PROM), erasable and programmable ROM (EPROM), electrically erasable and programmable ROM (EEPROM), etc.), mask ROM, flash ROM, a flash memory, and a solid state drive (SSD). The external memory 234 may further include flash drive, for example, compact flash (CF), secure digital (SD), micro-SD, mini-SD, extreme Digital (xD), a multi-media card (MMC), or a memory stick. The external memory 234 may be functionally or physically connected with the electronic device 201 through various interfaces.

The sensor module 240 measures physical quantity or senses an operation state of the electronic device 201 to convert the measured or sensed information into an electrical signal. The sensor module 240 may, for example, include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., RGB sensor), a biometric sensor 240I, a temperature/humidity sensor 240J, an illumination sensor 240K, and a ultraviolet (UV) sensor 240M. Additionally or alternatively, the sensor module 240 may include an E-nose sensor (not shown), an electromyography (EMG) sensor (not shown), an electroencephalogram (EEG) sensor (not shown), an electrocardiogram (ECG) sensor (not shown), an infrared (IR) sensor, an iris sensor, or a fingerprint sensor. The sensor module 240 may further include a control circuit for controlling at least one sensor included therein. In some embodiment, the electronic device 201 may further include a processor configured to control the sensor module 240 as part of or separately from the processor 210, to control the sensor module 240 during a sleep state of the processor 210. For example, the processor 210 may sense biometric information such as an iris or a fingerprint through an iris sensor or a fingerprint sensor and perform user authentication by using the sensed biometric information.

The input device 250 may include various input circuitry, such as, for example, and without limitation, a touch panel 252, a (digital) pen sensor 254, a key 256, or an ultrasonic input device 258. The touch panel 252 may use at least one of a capacitive type, a resistive type, an IR type, or an ultrasonic type. The touch panel 252 may further include a control circuit. The touch panel 252 may further include a tactile layer to provide tactile reaction to the user. The (digital) pen sensor 254 may include a recognition sheet which is a part of the touch panel 252 or a separate recognition sheet. The key 256 may also include a physical button, an optical key, or a keypad. The ultrasonic input device 258 senses ultrasonic waves generated by an input means through a microphone (e.g., the microphone 288) and checks data corresponding to the sensed ultrasonic waves.

The display 260 (e.g., the display 160) may include a panel 262, a hologram device 264, a projector 266, or a control circuit for controlling them. The panel 262 may be implemented to be flexible, transparent, or wearable. The panel 262 may be configured with the touch panel 252 in one module. According to an embodiment, the panel 262 may include a pressure sensor (or a "force sensor", interchangeably used hereinafter) capable of measuring a strength of a pressure by a user's touch. The pressure sensor may be implemented integrally with the touch panel 252 or may be implemented as one or more sensors separate from the touch panel 252. The hologram device 264 shows a stereoscopic image in the air by using interference of light. The projector 266 displays an image onto an external screen through projection of light. The screen may be positioned inside or outside the electronic device 201. According to an embodiment, the display 260 displays content information (e.g., display information (e.g., an image, an icon, a text, video, etc.) displayed on a display provided in a vehicle) received from the vehicle device 102 when being connected with the vehicle device 102 (or the vehicle).

According to an embodiment, the interface 270 may include various interface circuitry, such as, for example, and without limitation, a high-definition multimedia interface (HDMI) 272, a universal serial bus (USB) 274, an optical communication 276, or a D-subminiature 278. The interface 270 may be included in the communication interface 170 illustrated in FIG. 1. Additionally or alternatively, the interface 270 may include, for example, an MHL interface, an SD card/MMC interface, or an IrDA standard interface.

The audio module 280 bi-directionally converts sound and an electric signal. At least one element of the audio module 280 may be included in the input/output interface 145 illustrated in FIG. 1. The audio module 280 processes sound information input or output through the speaker 282, the receiver 284, the earphone 286, or the microphone 288.

According to an embodiment, the audio module 280 transmits processed sound information to the vehicle device 102 (or the vehicle). The vehicle device 102 (or the vehicle) having received the sound information outputs the sound information through an audio input/output device (e.g., a speaker) provided in the vehicle device 102 (or the vehicle).

The camera module 291 is, for example, a device capable of capturing a still image or a moving image, and according to an embodiment, may include one or more image sensors (e.g., a front sensor or a rear sensor), a lens, an image signal processor (ISP), or a flash (e.g., an LED, a xenon lamp, etc.).

The power management module 295 manages power of the electronic device 201. According to an embodiment, the power management module 295 may include a power management integrated circuit (PMIC), a charger IC, or a battery fuel gauge. The PMIC may have a wired or wireless charging scheme. The wireless charging scheme includes a magnetic-resonance type, a magnetic induction type, and an electromagnetic type, and for wireless charging, an additional circuit, for example, a coil loop, a resonance circuit, or a rectifier may be further included. The battery gauge measures the remaining capacity of the battery 296 or the voltage, current, or temperature of the battery 296 during charging. The battery 296 may include a rechargeable battery or a solar battery.

The indicator 297 displays a particular state, for example, a booting state, a message state, or a charging state, of the electronic device 201 or a part thereof (e.g., the processor 210). The motor 298 converts an electric signal into mechanical vibration or generates vibration or a haptic effect. The electronic device 201 may include a device for supporting the mobile TV (e.g., a GPU) to process media data according to a standard such as digital multimedia broadcasting (DMB), digital video broadcasting (DVB), or mediaFlo™. Each of the foregoing elements described herein may be configured with one or more components, names of which may vary with a type of the electronic device. In various embodiments, some components of the electronic device (e.g., the electronic device 201) may be omitted or may further include other elements, and some of the components may be coupled to form one entity and identically perform functions of the components before being coupled.

Figure 3:
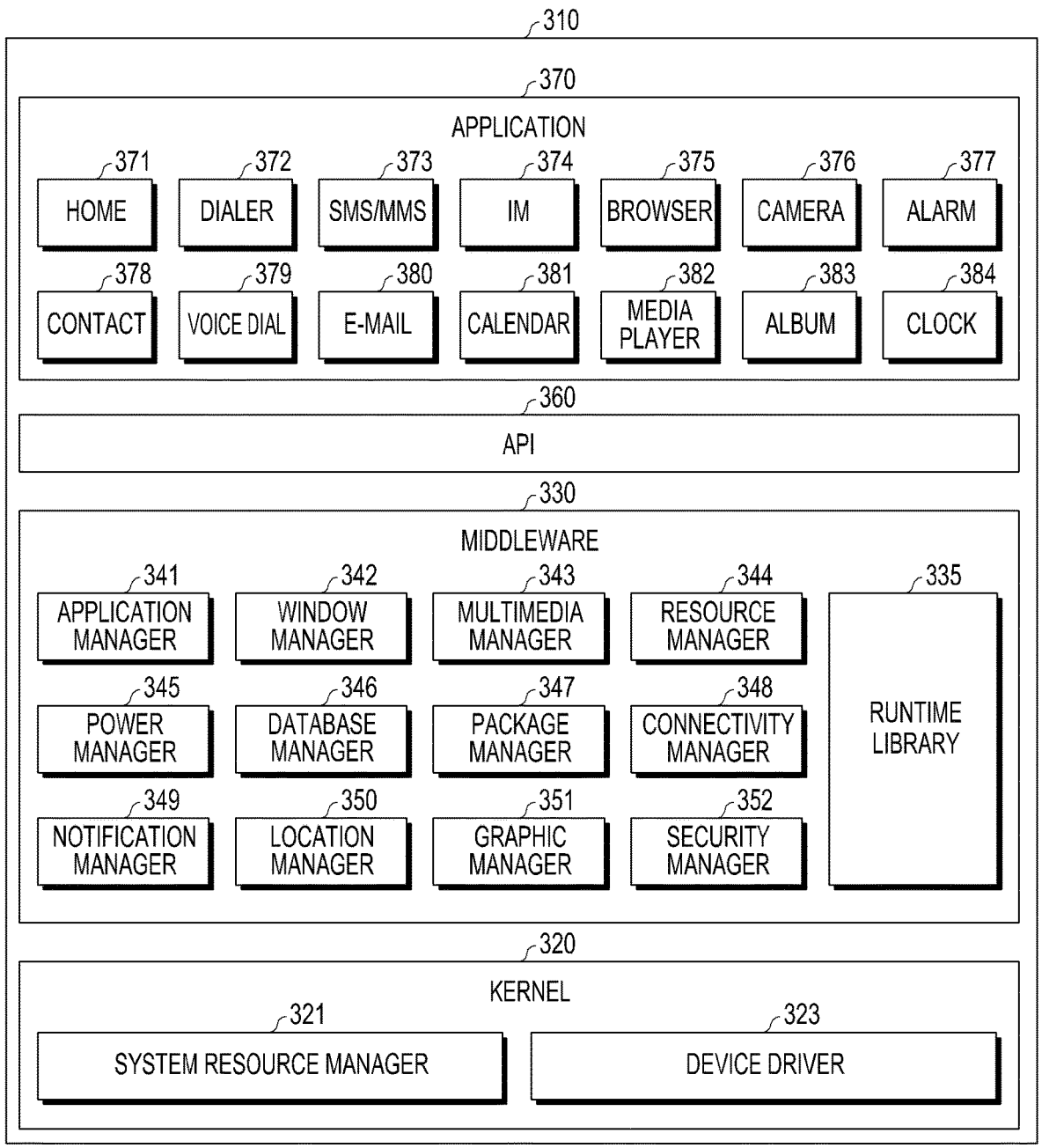
FIG. 3 is a block diagram illustrating an example programming module according to various example embodiments of the present disclosure.

FIG. 3 is a block diagram illustrating an example programming module according to various embodiments of the present disclosure.

According to an embodiment, a programming module 310 (e.g., the program 140) may include an OS for controlling resources associated with an electronic device (e.g., the electronic device 101) or various applications (e.g., the application program 147) executed on the OS. The OS may include Android™, iOS™, Windows™, Symbian™, Tizen™, or Bada™.

Referring to FIG. 3, the programming module 310 may include a kernel 320 (e.g., the kernel 141), middleware 330 (e.g., the middleware 143), an application programming interface (API) 360 (e.g., the API 145), or an application 370 (e.g., the application program 147). At least a part of the programming module 310 may be preloaded on an electronic device or may be downloaded from an external device (e.g., the vehicle device 102, the electronic device 104, or the server 106).

The kernel 320 may include a system resource manager 321 or a device driver 323. The system resource manager 321 may perform control, allocation, retrieval of system resources, and so forth. According to an embodiment, the system resource manager 321 may include a process management unit, a memory management unit, or a file system management unit. The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330 may include provide functions that the application 370 commonly requires or provide various functions to the application 370 through the API 360 to allow the application 370 to use a limited system resource in an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses to add a new function through a programming language while the application 370 is executed. The runtime library 335 performs input/output management, memory management, or calculation function processing. The application manager 341 manages a life cycle of the applications 370. The window manager 342 manages a GUI resource used in a screen. The multimedia manager 343 recognizes a format necessary for playing media files and performs encoding or decoding on a media file by using a codec appropriate for a corresponding format. The resource manager 344 manages a source code or a memory space of the applications 370. The power manager 345 manages a battery or power and provides power information necessary for an operation of the electronic device. According to an embodiment, the power manager 345 may operate with basic input/output system (BIOS). The database manager 346 generates, searches or changes a database used for at least one application among the applications 370. The package manager 347 manages the installation or update of an application distributed in a package file format.

The connectivity manager 348 manages a wireless connection. The notification manager 349 provides an event, e.g., an arriving message, an appointment, proximity notification, etc. The location manager 350 manages location information of an electronic device. The graphic manager 351 manages a graphic effect to be provided to a user or a user interface relating thereto. The security manager 352 provides system security or user authentication. According to an embodiment, the middleware 330 may further include a telephony manager for managing a voice or video call function of the electronic device or a middleware module forming a combination of functions of the above-described components. According to an embodiment, the middleware 330 provides a module specified for each type of an OS. Additionally, the middleware 330 may delete some of existing elements or add new elements dynamically. The API 360 may be provided as a set of API programming functions with a different configuration according to the OS. In the case of Android or iOS, for example, one API set may be provided by each platform, and in the case of Tizen, two or more API sets may be provided.

The application 370 may include one or more applications capable of providing a function, for example, a home application 371, a dialer application 372, a short messaging service/multimedia messaging service (SMS/MMS) application 373, an instant message (IM) application 374, a browser application 375, a camera application 376, an alarm application 377, a contact application 378, a voice dial application 379, an e-mail application 380, a calendar application 381, a media player application 382, an album application 383, a clock application 384. In addition, the application 370 may include various applications (not shown), such as, for example, and without limitation, a health care application (e.g., an application for measuring an exercise amount, a blood sugar, etc.), an environment information providing application (e.g., an application for providing air pressure, humidity, or temperature information or the like), an application using vehicle information (e.g., a vehicle insurance-related application), a navigation application, a point of interest (PoI) application, a music-related application, a call-related application, or the like.

According to an embodiment, the application 370 may include an information exchange application supporting information exchange between the electronic device and an external electronic device. The information exchange application may include, for example, a notification relay application for transferring specific information to the external electronic device or a device management application for managing the external electronic device. For example, the notification relay application may transmit notification information generated in another application of the electronic device to an external electronic device or may receive notification information from the external electronic device and provide the notification information to the user. The device management application may manage (e.g., install, remove, or update) a function (e.g., turn on/turn off of an external electronic device itself (or a part thereof) or control of brightness (or resolution) of a display) of an external device communicating with the electronic device, a service provided by an application operating in an external electronic device or provided by the external electronic device (e.g., a call service or a message service). According to an embodiment, the application 370 may include an application (e.g., device health care application of mobile medical equipment) designated according to an attribute of the external electronic device. According to an embodiment, the application 370 may include an application received from the external electronic device. The at least a part of the programming module 310 may be implemented (e.g., executed) by software, firmware, hardware (e.g., the processor 210), or a combination of two or more of them, and may include, for example, modules, programs, routines, sets of instructions, or processes for performing one or more functions.

Figure 4:
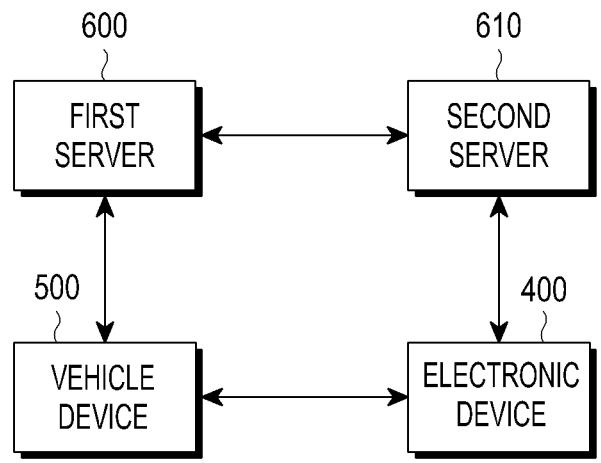
FIG. 4 is a diagram illustrating an example of an electronic device, a vehicle device, a first server, and a second server according to various example embodiments of the present disclosure.

FIG. 4 is a diagram illustrating an example of an electronic device, a vehicle device, a first server, and a second server according to various example embodiments of the present disclosure.

According to various embodiments, a vehicle device 500 may be an in-vehicle infotainment (IVI) device. A first server 600 may be a data server that receives vehicle information, and a second server 610 may be an authentication server that issues a certificate of authentication (or an authentication certificate). The second server 610 may be implemented with a plurality of servers, and the first server 600 and the second server 610 may be implemented with one server.

Referring to FIG. 4, an electronic device 400 is electrically connected with a vehicle device 500 using wired or wireless communication and is connected to a first session with the vehicle device 500 to check capability information of a vehicle (or the vehicle device 500) and perform negotiation for the first session.

According to an embodiment, the electronic device 400 and the vehicle device 500 may be connected using wired communication with a USB input/output port or using short-range wireless communication such as Bluetooth, WiFi, etc. The electronic device 400 identifies a specific mode of an USB, WiFi information, a Bluetooth profile, and so forth to recognize connection with the vehicle device 500. The vehicle device 500 is provided in the vehicle or is wired/wirelessly connected with the vehicle outside the vehicle.

The electronic device 400 is connected to the first session with the vehicle device 500 to identify capability information of the vehicle and negotiate information to be used for the first session. The capability information of the vehicle may include display resolution information supported by the vehicle, input device information, application or function information, an audio/video transport scheme, codec information, data service and device attestation information, and so forth. For example, the electronic device 400 may negotiate a display resolution, an input device, an application or function, an audio/video transport scheme, a codec, etc., to be used for a session with the vehicle device 500. The electronic device 400 determines whether the vehicle supports a vehicle information providing application when identifying the capability information of the vehicle, and executes the vehicle information providing application if the vehicle supports the vehicle information providing application.

According to an embodiment, if determining based on the capability information that the vehicle device 500 supports a service for providing vehicle information, the electronic device 400 is connected to a second session with the vehicle device 500 to provide the vehicle information and is connected to a third session with the first server 600. The electronic device 400 transmits a certificate of authentication of a user using the electronic device 400 (or a certificate of authentication of a driver) or a certificate of authentication of the electronic device 400 to the vehicle device 500, and receives a certificate of authentication of the vehicle device 500 (e.g., a vehicle certificate of authentication) from the vehicle device 500. For example, the user authentication certificate, the electronic device authentication certificate, and vehicle authentication certificate may include an extension identifier (ID), a vehicle ID, an electronic device ID, an ID of a first server 600 (or a data server (e.g., an insurance company)) (a first server ID), a user (or driver) (e.g., a service subscriber) (a user ID), a service ID, user driving information, service information (e.g., a discount rate, a mileage, a service time, etc.), a service area, country information, and so forth.

To issue the authentication certificate of the electronic device 400, the electronic device 400 generates a key pair (e.g., a public key and a secret key) and transmits the generated public key of the electronic device 400 to the second server 610 (e.g., the authentication server).

To issue the authentication certificate of the vehicle device 500, the vehicle device 500 generates a key pair for issuing the authentication certificate of the vehicle and transmits the generated public key of the vehicle device 500 to the second server 610 (e.g., the authentication server) through the electronic device 400. According to various embodiments, the vehicle device 500 may directly transmit the public key of the vehicle device 500 to the second server 610 without using the electronic device 400. The second server 610 having received the public key of the electronic device 400 and the public key of the vehicle device 500 from the electronic device 400 generates an electronic device authentication certificate in which the public key of the electronic device 400 is signed using the secret key of the second server 610, and generates a vehicle authentication certificate (or a vehicle device authentication certificate) in which the public key of the vehicle device 500 is signed using the secret key of the second server 610. The second server 610 transmits the public key of the second server 610 and the electronic device authentication certificate, and the public key of the second server 610 and the vehicle authentication certificate to the electronic device 400, and the electronic device 400 having received them stores the public key of the second server 610 and the electronic device authentication certificate and transmits the public key of the second server 610 and the vehicle authentication certificate to the vehicle device 500. For example, the second server 610 may transmit the generated electronic device authentication certificate and the vehicle authentication certificate to a storage device (e.g., a USB memory) and the storage device having stored them transmits the electronic device authentication certificate or the vehicle authentication certificate to the electronic device 400 or the vehicle device 500.

According to various embodiments, the second server 610 transmits the public key of the second server 610 and the electronic device authentication certificate to the electronic device 400 and transmits the public key of the second server 610 and the vehicle authentication certificate to the vehicle device 500. The vehicle device 500 stores the public key of the second server 610 and the vehicle authentication certificate received from the second server 610 or the electronic device 400, or stores the public key of the second server 610 and the user authentication certificate received from the first server 600.

To issue the authentication certificate of the user (e.g., the user of the electronic device 400 or the driver of the vehicle), the electronic device 400 generates a user's key pair, and if user subscription information (e.g., personal information (e.g., a name, contact information, an address, an ID, a password, biometric information, etc.) of the user of the electronic device 400 or the driver of the vehicle) to subscribe to a particular service (e.g., an insurance server) provided by the first server 600 is input, the electronic device 400 transmits the user subscription information, together with the public key of the generated key pair to the first server 600.

The first server 600 having received the user public key and subscription information from the electronic device 400 stores the user subscription information, and transmits the user public key and a request for generating the user authentication certificate to the second server 610. The second server 610 generates the user authentication certificate in which the user public key is signed using the secret key of the second server 610, in response to the request, and transmits the public key of the second server 610 to the first server 600, together with the generated user authentication certificate. Upon receiving the user authentication certificate, together with the public key of the second server 610, from the second server 610, the first server 600 transmits the received user authentication certificate to the electronic device 400 or to the vehicle device 500.

According to various embodiments, the first server 600 generates the user authentication certificate in which the user public key is signed using the secret key of the first server 600, and transmits the generated user authentication certificate, together with the public key of the first server 600, to the electronic device 400 or the vehicle device 500. According to an embodiment, the electronic device 400 verifies the vehicle authentication certificate by using the public key of the second server 610 (e.g., the authentication server) to determine whether the vehicle (or the vehicle device 500) of the vehicle authentication certificate is a proper vehicle. The vehicle device 500 verifies the user authentication certificate or the electronic device authentication certificate by using the public key of the second server 610 to determine whether the user of the user authentication certificate is a proper user or the electronic device 400 of the electronic device authentication certificate is a proper electronic device. Through authentication certificate verification, the electronic device 400 identifies the public key of the vehicle device 500 and the vehicle device 500 identifies the public keys of the electronic device 400 or the user.

According to an embodiment of the present disclosure, the electronic device 400 may perform user authentication (or driver authentication). The electronic device 400 may perform user authentication if the vehicle device 500 supports a service for providing vehicle information or an application for providing vehicle information is executed through the first session between the electronic device 400 and the vehicle device 500. For example, the electronic device 400 may perform user authentication through password input, personal identification number (PIN) input, fingerprint input, etc.

According to various embodiments, the electronic device 400 displays a notification screen showing, for example, 'provide vehicle information?' on an application execution screen, if the application for providing the vehicle information is executed. The electronic device 400 performs the user authentication upon receiving an input for agreeing to provide the vehicle information. For example, the electronic device 400 may display a screen for user authentication (e.g., a log-in screen) through a display of the electronic device 400 or a display of the vehicle device 500. If a user's ID/password or biometric information is input through a touch sensitive screen of the electronic device 400 or an input device (e.g., a keypad, a touch sensitive screen, etc.) of the vehicle device 500 or if an input of the biometric information is sensed through a sensor of the electronic device 400, the electronic device 400 transmits a user authentication request message including input personal information (e.g., an ID/password or biometric data) to the first server 600. The first server 600 having received the user authentication request message determines whether personal information matching the received personal information exists in previously stored personal information, and terminates user authentication if the matching personal information exists. Once user authentication is completed, the first server 600 sends a user authentication success message indicating that user authentication is successful to the electronic device 400 in response to the user authentication request message.

According to an embodiment, the electronic device 400 transmits the user authentication certificate, the electronic device authentication certificate, and the vehicle authentication certificate to the first server 600 which then verifies the user authentication certificate, the electronic device authentication certificate, and the vehicle authentication certificate by using the public key of the second server 610 to determine whether the user of the user authentication certificate, the electronic device 400 of the electronic device authentication certificate, and the vehicle (or the vehicle device 500) of the vehicle authentication certificate are proper.

According to various embodiments, the first server 600 verifies the user authentication certificate by using the public key of the first server 600 if the user authentication certificate is generated using the secret key of the first server 600.

According to an embodiment, the first server 600 having completed verification of the authentication certificates generate a session key set including a plurality of session keys (or at least one session key) for transmitting and receiving the vehicle information. The first server 600 encrypts the generated session key set using the public key of the vehicle device 500, signs the encrypted session key set using the secret key of the first server 600 and transmits the signature and the encrypted session key set of the first server 600 to the electronic device 400. For example, the first server 600 may apply a hash function (or a hash algorithm) to the encrypted session key set to calculate a hash value, and encrypt the calculated hash value using the secret key of the first server 600 to generate the signature of the first server 600.

According to an embodiment, the electronic device 400 transmits the signature and the encrypted session key set of the first server 600 received from the first server 600 to the vehicle device 500.

According to an embodiment, the vehicle device 500 having received the signature and the encrypted session key set of the first server 600 may verify the signature of the first server 600 using the public key of the first server 600 and decrypt the encrypted session key set using the secret key of the vehicle device 500 to obtain a session key set. For example, the electronic device 400 may decrypt the signature of the first server 600 using the public key of the first server 600 to obtain the hash value and may calculate the hash value by applying the hash function to the encrypted session key set. If the obtained hash value and the calculated hash value match each other, the electronic device 400 determines that the encrypted session key set has been transmitted from the first server 600 or the encrypted session key set is not to be changed.

According to an embodiment, the vehicle device 500 may obtain vehicle item-specific information. The vehicle item-specific information may include first vehicle item-specific information (or driving item-specific information) (e.g., a date of driving, a driving distance, a duration of driving, a frequency of driving, a driving location, etc.) and second vehicle item-specific information (or driver's behavior item-specific information) (e.g., a peak speed, an average speed, hard acceleration, hard breaking, hard cornering, a revolution per minute (RPM) of an engine, and so forth. For example, the vehicle item-specific information may be obtained by the vehicle device 500 or may be received from a vehicle information collection device connected to the vehicle device 500.

The vehicle device 500 encrypts the obtained vehicle item-specific information (e.g., first vehicle item-specific information and second vehicle item-specific information) and vehicle information (e.g., first vehicle information) including a plurality of identifiers by using a public key (e.g., a first session key) of one session key of the obtained session key set. For example, the plurality of identifiers may include a driving information ID, a vehicle ID, a first server ID, and a driver ID, etc. The first vehicle information may include all the vehicle item-specific information or a part (or at least a part) of the vehicle item-specific information.

The vehicle device 500 transmits, to the electronic device 400, second vehicle information (the signature and the encrypted vehicle information of the vehicle device 500) in which the encrypted vehicle information is signed using the secret key of the vehicle device 500.

According to an embodiment, the electronic device 400 having received the second vehicle information performs user authentication, transmits, to the first server 600, third vehicle information (the signature of the vehicle device 500, the signature of the user, and the encrypted vehicle information) in which the second vehicle information is signed using the secret key of the user. For example, the electronic device 400 may sign the second vehicle information using the secret key of the user's key pair generated for issuing the user authentication certificate or may generate the user's key pair by performing user authentication, and sign the second vehicle information using the secret key of the generated key pair.

According to various embodiments, the electronic device 400 may perform user authentication, sign the second vehicle information using the secret key of the user generated through user authentication, and transmit the signed second vehicle information to the first server 600. For example, the electronic device 400 may perform user authentication, and if having completed user authentication, the electronic device 400 may generate a first public key and a first secret key for the signature of the user and transmit the generated first public key to the first server 600. The electronic device 400 signs the second vehicle information with a first secret key to generate the third vehicle information. According to various embodiments, if not performing user authentication, the electronic device 400 may sign the second vehicle information (e.g., the third vehicle information) using the secret key of the user and transmit the signed second vehicle information to the first server 600.

According to an embodiment, the first server 600 having received the third vehicle information from the electronic device 400 may verify the signature of the vehicle device 500 using the public key of the vehicle device 500 and may verify the user's signature using the public key of the user. The first server 600 decrypts the encrypted vehicle information using the secret key of the first session key to obtain the vehicle information.

According to various embodiments, the first server 600 having completed authentication certification verification generates a session key set for a third session between the electronic device 400 and the first server 600. The first server 600 encrypts the session key set for the third session using the user's public key, signs the encrypted session key set using the secret key of the first server 600, and transmits the signed session key set, together with the signature of the first server 600, to the electronic device 400.

According to various embodiments, the electronic device 400 having received the encrypted session key set of the first server 600, together with the signature of the first server 600, may verify the signature of the first server 600 using the public key of the first server 600 and decrypt the encrypted session key set using the secret key of the user to obtain a session key set for the third session. The electronic device 400 generates a session key set for the second session between the electronic device 400 and the vehicle device 500, encrypts a public key (e.g., a second session public key) for one session key (e.g., a second session key) of the generated session key set using the public key of the vehicle device 500, signs the encrypted second session public key using the secret key of the user, and transmits the signed second session public key, together with the signature of the user, to the vehicle device 500.

According to various embodiments, the vehicle device 500 having received the encrypted second session public key, together with the signature of the user, may verify the signature of the user using the public key of the user and decrypt the encrypted second session public key using the secret key of the vehicle device 500 to obtain the second session public key. The vehicle device 500 obtains vehicle item-specific information (e.g., the first vehicle item-specific information and the second vehicle item-specific information). The vehicle device 500 encrypts the first vehicle information of a first type including a plurality of IDs and the obtained first vehicle item-specific information by using the second session public key, and encrypts the first vehicle information of a second type including a plurality of IDs and the obtained second vehicle item-specific information by using the second session public key. The vehicle device 500 signs the encrypted first-type first vehicle information using the secret key of the vehicle device 500 to generate the second vehicle information of a first type and signs the encrypted second-type first vehicle information using the secret key of the vehicle device 500 to generate the second vehicle information of a second type. The vehicle device 500 transmits the first-type second vehicle information and the second-type second vehicle information to the electronic device 400.

According to various embodiments, the electronic device 400 having received the first-type second vehicle information and the second-type second vehicle information may verify the signature of the vehicle device 500 regarding the second-type second vehicle information using the public key of the vehicle device 500 and decrypt the encrypted second vehicle item-specific information using the secret key of the second session key (e.g., the second session secret key) to obtain the second vehicle item-specific information. According to various embodiments, the electronic device 400 may verify the signature of the vehicle device 500 regarding the first-type second vehicle information using the public key of the vehicle device 500 and decrypt the encrypted first vehicle item-specific information using the secret key of the second session key (e.g., the second session secret key) to obtain the first vehicle item-specific information.

The electronic device 400 encrypts the obtained second vehicle item-specific information and the second session secret key using the public key (e.g., a third session public key) of one session key (e.g., the third session key) of the session key set for the third session, and signs the encrypted second vehicle item-specific information and second session secret key using the secret key of the user to generate the second vehicle information of a third type. The electronic device 400 transmits the third vehicle information including the first-type second vehicle information and the third-type second vehicle information to the first server 600. According to various embodiments, the electronic device 400 encrypts the obtained first vehicle item-specific information and the second session secret key using the third session public key, and signs the encrypted first vehicle item-specific information using the secret key of the user to generate the second vehicle information of the third type.

According to various embodiments, the electronic device 400 may perform user authentication, sign the obtained second vehicle item-specific information and the second session secret key using the secret key of the user generated through user authentication, and transmit the signed second vehicle item-specific information and second session secret key to the first server 600. For example, the electronic device 400 may perform user authentication, and if having completed user authentication, the electronic device 400 may generate a first public key and a first secret key for the signature of the user and transmit the generated first public key to the first server 600. The electronic device 400 signs the obtained second vehicle item-specific information and the second session secret key using the first secret key to generate the second vehicle information of the third type.

According to an embodiment, the first server 600 having received the third vehicle information may verify the signature of the vehicle device 500 regarding the first-type second vehicle information using the public key of the vehicle device 500 and may verify the user's signature regarding the second-type second vehicle information using the public key of the user. The first server 600 decrypts the second-type second vehicle information using the secret key (e.g., a third session secret key) for the third session key to obtain a plurality of IDs, the second vehicle item-specific information, and the second session secret key. The first server 600 decrypts the first-type second vehicle information using the obtained second session secret key to obtain a plurality of IDs and the first vehicle item-specific information.

According to various embodiments, the first server 600 may generate a session key set for transmitting and receiving vehicle information and encrypt a vehicle information policy indicating a criterion for determining vehicle information related to a service (e.g., an insurance service) supported in the first server 600, together with the generated session key set, by using the public key of the vehicle device 500. For example, the vehicle information policy may include information for determining vehicle item-specific information (e.g., hard breaking, hard acceleration, etc.) used for a service by the first server 600. The first server 600 may sign the encrypted session key set and vehicle information policy using the secret key of the first server 600, and transmit the signature, the encrypted session key set and vehicle information policy of the first server 600 to the electronic device 400.

According to various embodiments, the electronic device 400 having received the signature, the encrypted session key set and vehicle information policy of the first server 600 from the first server 600 may transmit the received signature, encrypted session key set and vehicle information policy of the first server 600 to the vehicle device 500.

According to various embodiments, the vehicle device 500 having received the signature, the encrypted session key set and vehicle information policy of the first server 600 may verify the signature of the first server 600 using the public key of the first server 600 and decrypt the encrypted session key set and vehicle information policy using the secret key of the vehicle device 500 to obtain the session key set and the vehicle information policy. The vehicle device 500 obtains vehicle item-specific information and detects at least partial vehicle item-specific information based on the vehicle information policy of the obtained vehicle item-specific information. For example, the vehicle device 500 may detect vehicle item-specific information (e.g., hard breaking, hard acceleration, etc.) corresponding to (or suitable for) the vehicle information policy.

The vehicle device 500 encrypts the first vehicle information including the detected at least partial vehicle item-specific information and a plurality of IDs by using the public key (e.g., the first session key) of one session key of the obtained session key set. The vehicle device 500 signs the encrypted first vehicle information using the secret key of the vehicle device 500 and transmits the second vehicle information including the signature and the encrypted first vehicle information of the vehicle device 500 to the electronic device 400.

According to various embodiments, the electronic device 400 having received the second vehicle information may sign the second vehicle information using the user's secret key and transmit the third vehicle information including the signature of the user and the second vehicle information to the first server 600.

According to various embodiments, the first server 600 having received the third vehicle information may verify the signature of the vehicle device 500 using the public key of the vehicle device 500 and may verify the user's signature using the public key of the user. The first server 600 decrypts the encrypted first vehicle information using the first session secret key to obtain the first vehicle information.

According to various embodiments, the first server 600 having completed authentication certification verification generates a session key set for a third session between the electronic device 400 and the first server 600. The first server 600 encrypts the session key set for the third session and the vehicle information policy using the user's public key, signs the encrypted session key set and vehicle information policy using the secret key of the first server 600, and transmits the signed session key set and vehicle information policy to the electronic device 400.

According to various embodiments, the electronic device 400 having received the encrypted session key set and vehicle information policy of the first server 600, together with the signature of the first server 600, may verify the signature of the first server 600 using the public key of the first server 600 and decrypt the encrypted session key set and vehicle information policy using the secret key of the user to obtain the session key set and the vehicle information policy for the third session. The electronic device 400 generates a session key set for the second session between the electronic device 400 and the vehicle device 500, encrypts a public key (e.g., a second session public key) for one session key (e.g., a second session key) of the generated session key set using the public key of the vehicle device 500, signs the encrypted second session public key using the secret key of the user, and transmits the signed second session public key to the vehicle device 500.

According to various embodiments, the vehicle device 500 having received the encrypted second session public key, together with the signature of the user, may verify the signature of the user using the public key of the user and decrypt the encrypted second session public key using the secret key of the vehicle device 500 to obtain the second session public key. The vehicle device 500 obtains vehicle item-specific information (e.g., the first vehicle item-specific information and the second vehicle item-specific information). The vehicle device 500 encrypts a plurality of IDs and the obtained first vehicle item-specific information by using the second session public key, and encrypts a plurality of IDs and the obtained second vehicle item-specific information by using the second session public key. The vehicle device 500 signs the encrypted first vehicle item-specific information using the secret key of the vehicle device 500 to generate the first-type second vehicle information and signs the encrypted second vehicle item-specific information using the secret key of the vehicle device 500 to generate the second-type second vehicle information. The vehicle device 500 transmits the first-type second vehicle information and the second-type second vehicle information to the electronic device 400.

According to various embodiments, the electronic device 400 having received the first-type second vehicle information and the second-type second vehicle information may verify the signature of the vehicle device 500 regarding the second-type second vehicle information using the public key of the vehicle device 500 and decrypt the encrypted second vehicle item-specific information using the second session secret key to obtain the second vehicle item-specific information. According to various embodiments, the electronic device 400 may verify the signature of the vehicle device 500 regarding the first-type second vehicle information using the public key of the vehicle device 500 and decrypt the encrypted first vehicle item-specific information using the second session secret key to obtain the first vehicle item-specific information.

According to various embodiments, the electronic device 400 may detect at least partial second vehicle item-specific information based on the vehicle information policy of the obtained second vehicle item-specific information and encrypt the second session secret key, together with the plurality of IDs and the detected at least partial second vehicle item-specific information, by using the third session public key. The electronic device 400 signs the encrypted plurality of IDs, detected at least partial second vehicle item-specific information and second session secret key by using the user's secret key to generate the third-type second vehicle information. The electronic device 400 transmits the third vehicle information including the first-type second vehicle information and the third-type second vehicle information to the first server 600.

According to various embodiments, the electronic device 400 may detect at least partial first vehicle item-specific information based on the vehicle information policy of the obtained first vehicle item-specific information and encrypt the second session secret key, together with the plurality of IDs and the detected at least partial first vehicle item-specific information, by using the third session public key. The electronic device 400 signs the encrypted plurality of IDs, detected at least partial first vehicle item-specific information, and second session secret key by using the user's secret key to generate the third-type second vehicle information.

According to an embodiment, the first server 600 having received the third vehicle information may verify the signature of the vehicle device 500 regarding the first-type second vehicle information using the public key of the vehicle device 500 and may verify the user's signature regarding the second-type second vehicle information using the public key of the user. The first server 600 decrypts the second-type second vehicle information using the secret key (e.g., the third session secret key) for the third session key to obtain the second vehicle item-specific information and the second session secret key. The first server 600 decrypts the first-type second vehicle information using the obtained second session secret key to obtain the first vehicle item-specific information.

According to an embodiment, the first server 600 having received the third vehicle information may verify the signature of the vehicle device 500 regarding the second-type second vehicle information using the public key of the vehicle device 500 and may verify the user's signature regarding the first-type second vehicle information using the public key of the user. The first server 600 decrypts the first-type second vehicle information using the secret key (e.g., a third session secret key) for the third session key to obtain the first vehicle item-specific information and the second session secret key. The first server 600 decrypts the second-type second vehicle information using the obtained second session secret key to obtain the second vehicle item-specific information.

According to various embodiments, the first server 600 having received the vehicle information may transmit feedback information (e.g., service information (e.g., an insurance discount rate, etc.) related to vehicle information) regarding the obtained vehicle information to the electronic device 400. The electronic device 400 having received the feedback information stores the received feedback information in the memory 130 or displays the received feedback information on the display 160. The electronic device 400 also transmits the feedback information to the vehicle device 500 which then stores the feedback information in the memory of the vehicle (or the vehicle device 500) or displays the feedback information on the display.

Figure 5:
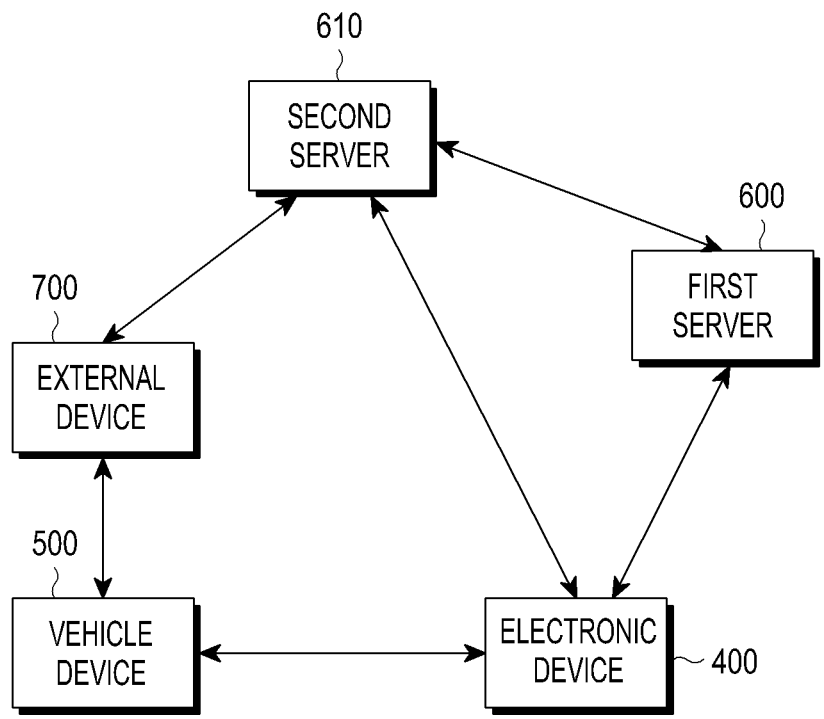
FIG. 5 is a diagram illustrating an example system for issuing a certificate of authentication according to various example embodiments of the present disclosure.

FIG. 5 is a diagram illustrating an example system for issuing an authentication certificate according to various example embodiments of the present disclosure.

According to various embodiments, the system may include the electronic device 400, the vehicle device 500, the first server 600, the second server 610, and an external device 700. The first server 600 may be an authentication server that issues the user authentication certificate, the second server 610 may be an authentication server that issues an authentication certificate of the electronic device 400, the vehicle device 500 or the external device 700, and the external device 700 may be an authentication server of a vehicle manufacturer.

To issue the authentication certificate of the electronic device 400, the electronic device 400 generates a public key and a secret key and transmits the generated public key of the electronic device 400 to the second server 610.

To issue the authentication certificate of the vehicle device 500, the vehicle device 500 generates the public key and the secret key of the vehicle device 500 and transmits the generated public key of the vehicle device 500 to the external device 700.

To issue the authentication certificate of the external device 700, the external device 700 generates a public key and a secret key of the external device 700 and transmits the generated public key of the external device 700 to the second server 610.

The second server 610 having received the public key of the electronic device 400 and the public key of the external device 700 from the external device 700 generates an electronic device authentication certificate in which the public key of the electronic device 400 is signed using the secret key of the second server 610, and generates an external device authentication certificate in which the public key of the external device 700 is signed using the secret key of the second server 610. The second server 610 transmits the public key of the second server 610 and the electronic device authentication certificate to the electronic device 400 and transmits the public key of the second server 610 and the external device authentication certificate to the external device 700.

The electronic device 400 having received the public key and the electronic device authentication certificate of the second server 610 from the second server 610 stores the public key of the second server 610 and the electronic device authentication certificate. For example, the electronic device 400, when being manufactured, may store the public key of the second server 610 and the electronic device authentication certificate.

The external device 700 having received the public key and the external device authentication certificate of the second server 610 from the second server 610 generates the vehicle authentication certificate in which the external device authentication certificate and the public key of the vehicle device 500 are signed using the secret key of the external device 700, and transmits the public key of the external device 700 and the vehicle authentication certificate to the vehicle device 500.

The vehicle device 500 having received the public key and the vehicle authentication certificate of the external device 700 from the external device 700 stores the public key of the external device 700 and the vehicle authentication certificate. For example, the vehicle device 500, when being manufactured, may store the public key of the external device 700 and the vehicle authentication certificate.

According to various embodiments, the vehicle device 500 may transmit the public key of the external device 700 and the vehicle authentication certificate to the electronic device 400 which may then verify the vehicle authentication certificate using the received public key of the external device 700. The electronic device 400 obtains the external device authentication certificate and the public key of the vehicle device 500 through vehicle authentication certificate verification. The electronic device 400 verifies the external device authentication certificate by using the public key of the second server 610 to determine whether the external device 700 of the external device authentication certificate is a proper external device.

To issue the authentication certificate of the user (e.g., the user of the electronic device 400 or the driver of the vehicle), the electronic device 400 generates a user's key pair, and if user subscription information to subscribe to a particular service is input, the electronic device 400 transmits the user subscription information, together with the public key of the generated key pair, to the first server 600.

The first server 600 having received the user public key and subscription information from the electronic device 400 stores the user subscription information and transmits the user public key and a request for generating the user authentication certificate to the second server 610. The second server 610 generates the user authentication certificate in which the user public key is signed using the secret key of the second server 610, in response to the request, and transmits the public key of the second server 610 to the first server 600, together with the generated user authentication certificate. Upon receiving the user authentication certificate together using the public key of the second server 610 from the second server 610, the first server 600 transmits the received user authentication certificate to the electronic device 400 or to the vehicle device 500.

According to various embodiments, the first server 600 generates the user authentication certificate in which the user public key is signed using the secret key of the first server 600, and transmits the generated user authentication certificate, together with the public key of the first server 600, to the electronic device 400 or the vehicle device 500.

Figure 6:
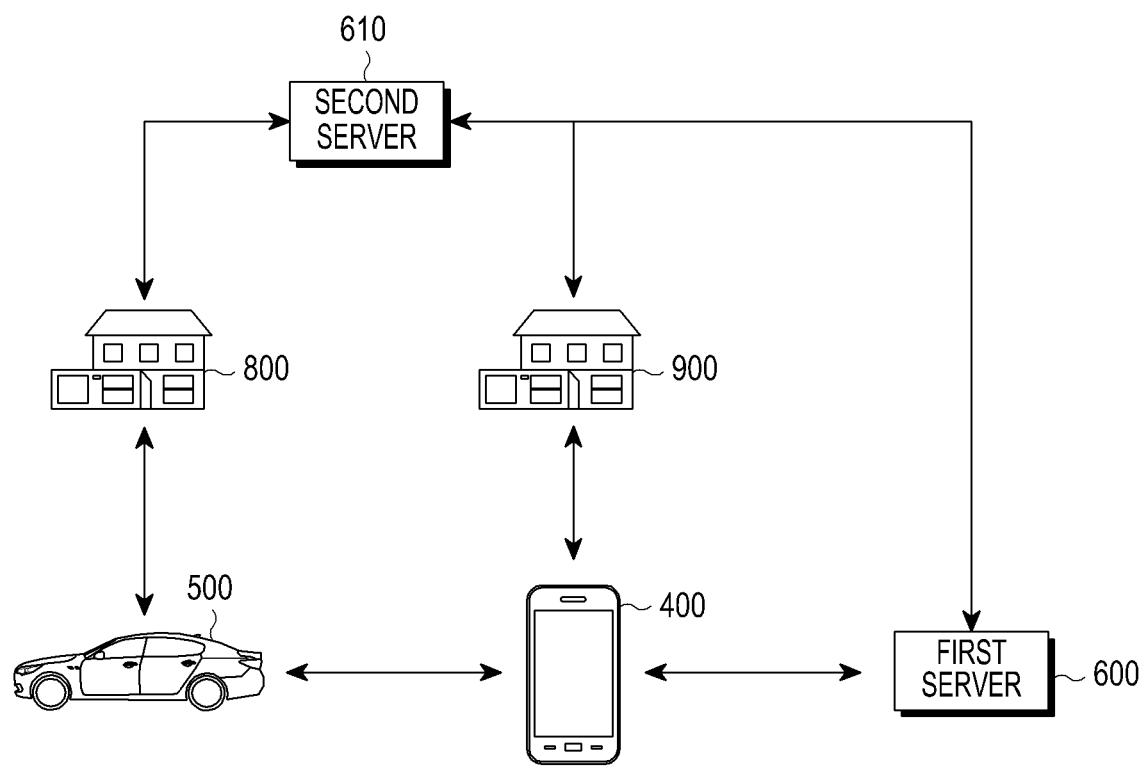
FIG. 6 is a diagram illustrating an example system for issuing a certificate of authentication according to various example embodiments of the present disclosure.

FIG. 6 is a diagram illustrating an example system for issuing an authentication certificate according to various example embodiments of the present disclosure.

According to various embodiments, the system may include the electronic device 400, the vehicle device 500, the first server 600, the second server 610, a first external device 800, and a second external device 900. According to various embodiments, the first server 600 may be an authentication server that issues the user authentication certificate, and the second server 610 may be an authentication server that issues an authentication certificate of the electronic device 400, the vehicle device 500, or the first external device 800 or the second external device 900. The first external device 800 may be an authentication server of a vehicle manufacturer, and the second external device 900 may be an authentication server of an electronic device manufacturer. For example, the second server 610 may be a root certification authority (CA), and the first external device 800 and the second external device 900 may be sub CAs.

To issue the authentication certificate of the electronic device 400, the electronic device 400 generates a public key and a secret key of the electronic device 400 and transmits the generated public key of the electronic device 400 to the second external device 900.

To issue the authentication certificate of the vehicle device 500, the vehicle device 500 generates the public key and the secret key of the vehicle device 500 and transmits the generated public key of the vehicle device 500 to the first external device 800.

To issue the authentication certificate of the first external device 800, the first external device 800 generates a public key and a secret key of the first external device 800 and transmits the generated public key of the first external device 800 to the second server 610.

To issue the authentication certificate of the second external device 900, the second external device 900 generates a public key and a secret key of the second external device 900 and transmits the generated public key of the second external device 900 to the second server 610.

The second server 610 having received the public key of the first external device 800 and the public key of the second external device 900 generates a first external device authentication certificate (e.g., a vehicle manufacturer authentication certificate) in which the public key of the first external device 800 is signed using the secret key of the second server 610 and generates a second external device authentication certificate (e.g., an electronic device manufacturer authentication certificate) in which the public key of the second external device 900 is signed using the secret key of the second server 610. The second server 610 transmits the public key and the first external device authentication certificate of the second server 610 to the first external device 800 and transmits the public key and the second external device authentication certificate of the second server 610 to the second external device 900.

The first external device 800 having received the public key and the first external device authentication certificate of the second server 610 from the second server 610 generates the vehicle authentication certificate in which the first external device authentication certificate and the public key of the vehicle device 500 are signed using the secret key of the first external device 800, and transmits the public key and the vehicle authentication certificate of the first external device 800 to the vehicle device 500.

The vehicle device 500 having received the public key and the vehicle authentication certificate of the first external device 800 from the first external device 800 stores the public key and the vehicle authentication certificate of the first external device 800. For example, the first external device 800, when being manufactured, may store the public key and the vehicle authentication certificate of the first external device 800 in the vehicle device 500.

According to various embodiments, the vehicle device 500 may transmit the public key and the vehicle authentication certificate of the first external device 800 to the electronic device 400 which may then verify the vehicle authentication certificate using the received public key of the first external device 800. The electronic device 400 obtains the first external device authentication certificate and the public key of the vehicle device 500 through vehicle authentication certificate verification. The electronic device 400 verifies the first external device authentication certificate by using the public key of the second server 610 to determine whether the first external device 800 of the first external device authentication certificate is a proper external device.

The second external device 900 having received the public key and the second external device authentication certificate of the second server 610 from the second server 610 generates the electronic device authentication certificate in which the second external device authentication certificate and the public key of the electronic device 400 are signed using the secret key of the second external device 900, and transmits the public key and the electronic device authentication certificate of the second external device 900 to the vehicle device 500.

The electronic device 400 having received the public key and the electronic device authentication certificate of the second external device 900 from the second external device 900 stores the public key and the electronic device authentication certificate of the second external device 900. For example, the second external device 900 may store the public key and the vehicle authentication certificate of the first external device 800 in the electronic device 400 when the electronic device 400 is manufactured.

According to various embodiments, the electronic device 400 may transmit the public key of the second external device 900 and the electronic device authentication certificate to the vehicle device 500 which may then verify the electronic device authentication certificate using the received public key of the second external device 900. The vehicle device 500 obtains the second external device authentication certificate and the public key of the electronic device 400 through electronic device authentication certificate verification. The vehicle device 500 verifies the second external device authentication certificate by using the public key of the second server 610 to determine whether the second external device 900 of the second external device authentication certificate is a proper external device.

To issue the user authentication certificate, the electronic device 400 generates a user's key pair and transmits a user public key of the generated key pair to the first server 600.

The first server 600 having received the user public key from the electronic device 400 generates the user authentication certificate in which the user public key is signed using the secret key of the first server 600, and transmits the generated user authentication certificate, together with the public key of the first server 600, to the electronic device 400 or the vehicle device 500.

According to various embodiments, the electronic device 400 transmits the public key and the user authentication certificate of the first server 600, and the public key and the electronic device authentication certificate of the second external device 900 to the vehicle device 500. The vehicle device 500 verifies the user authentication certificate using the public key of the first server 600 and verifies the electronic device authentication certificate using the public key of the second external device 900.

Figure 7A:
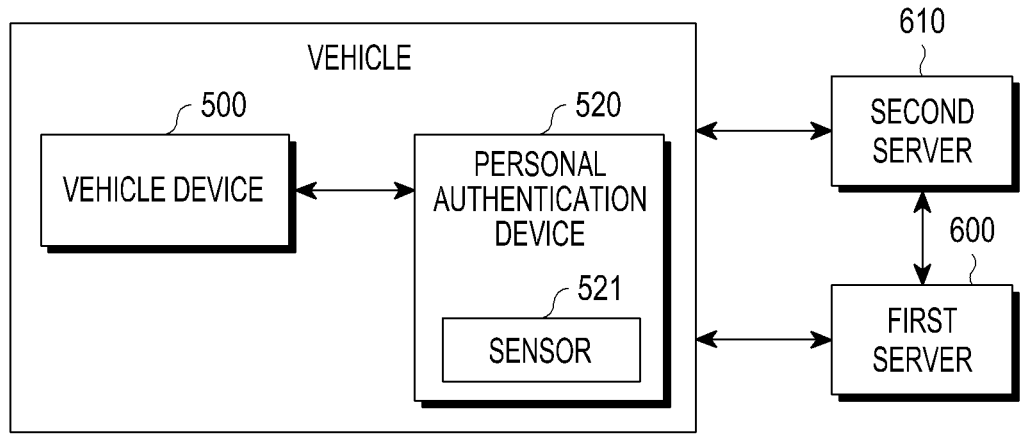
FIGS. 7A and 7B are block diagrams illustrating an example system for issuing a certificate of authentication according to various example embodiments of the present disclosure.
Figure 7B:
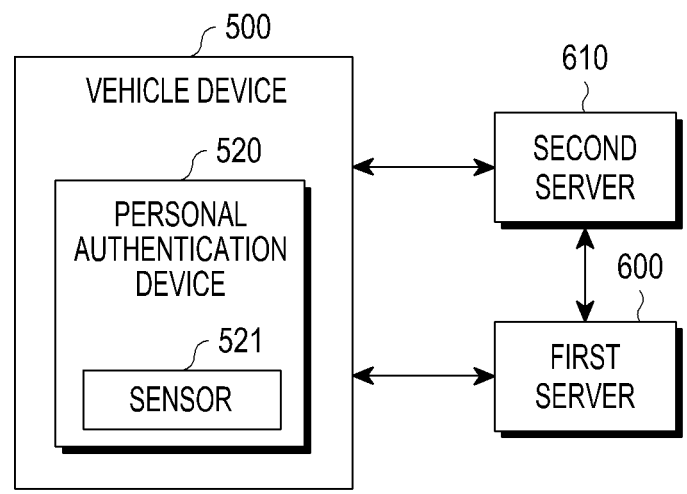

FIGS. 7A and 7B are block diagrams illustrating an example system for issuing an authentication certificate according to various embodiments of the present disclosure.

According to various embodiments, the system may include the vehicle device 500, a personal authentication device 520, the first server 600, and the second server 610. The vehicle device 500 and the personal authentication device 520 may be implemented in the vehicle. The personal authentication device 520 may be implemented in a door, a handle, a gear, etc., of the vehicle.

According to an embodiment, the personal authentication device 520 may be connected to the third session with the first server 600 and perform user authentication.

To issue the vehicle authentication certificate, the vehicle device 500 generates the public key and the secret key of the vehicle device 500 and transmits the generated public key of the vehicle device 500 to the second server 610 through the personal authentication device 520.

The second server 610 having received the public key of the vehicle device 500 generates the vehicle authentication certificate in which the public key of the vehicle device 500 is signed using the secret key of the second server 610, and transmits the generated vehicle authentication certificate, together with the public key of the second server 610, to the vehicle device 500 through the personal authentication device 520. The vehicle device 500 having received the public key and the vehicle authentication certificate of the second server 610 stores the received public key and vehicle authentication certificate of the second server 610.

To issue the user authentication certificate, the personal authentication device 520 executes an application related to a service provided by the first server 600 to display a screen (e.g., a log-in screen) for user authentication, such as a user's ID/password input or a fingerprint input through the display of the vehicle device 500. If the user's ID/password or fingerprint is input through the input device (e.g., a keypad, a touch sensitive screen, etc.) of the vehicle device 500 or if the fingerprint is input through, for example, a sensor 521 of the personal authentication device 520, the personal authentication device 520 transmits a user authentication request message including input personal information (e.g., the ID/password or fingerprint data) to the first server 600. The first server 600 having received the user authentication request message determines whether personal information matching the received personal information exists in previously stored personal information, and terminates (or completes) user authentication if the matching personal information exists.

Once user authentication is completed, the first server 600 signs a user authentication success message indicating that user authentication is successful by using a private key of the first server 600 and transmits the signed user authentication success message to the personal authentication device 520, in response to the user authentication request message. The personal authentication device 520 having received the signature and the user authentication success message of the first server 600 transmits the signature and the user authentication success message of the first server 600 to the vehicle device 500.

The vehicle device 500 verifies the signature of the first server 600 using the public key of the first server 600 and determines whether personal information for user authentication (e.g., logging-in) is input. If the personal information for user authentication is input, the vehicle device 500 generates a user's key pair for user authentication certificate generation, and generates and stores the user authentication certificate in which the user public key is signed using the secret key of the vehicle device 500.

According to various embodiments, to provide vehicle information, the vehicle device 500 may transmit the public key, the vehicle authentication certificate, and the user authentication certificate of the vehicle device 500 to the first server 600 through a personal authentication terminal. The first server 600 having received the public key, the vehicle authentication certificate, and the user authentication certificate of the second server 610 from the vehicle device 500 verifies the vehicle authentication certificate using the public key of the second server 610 to identify the public key of the vehicle device 500 and verifies the user authentication certificate using the identified public key of the vehicle device 500 to identify the public key of the user. The first server 600 generates a session key for a session with the vehicle device 500 and encrypts a public key of the generated session key (e.g., a session public key) and the user public key using the public key of the vehicle device 500. The first server 600 signs the encrypted session public key using the secret key of the first server 600 and transmits the secret key of the first server 600 and the encrypted session public key to the vehicle device 500 through the personal authentication device 520.

The vehicle device 500 verifies the signature of the first server 600 using the public key of the first server 600 and decrypt the encrypted session public key using the secret key of the vehicle device 500 to obtain the session public key. The vehicle device 500 obtains vehicle item-specific information and encrypts first vehicle information including a plurality of IDs and the vehicle item-specific information by using the session public key. The vehicle device 500 signs the encrypted first vehicle information using the secret key of the vehicle device 500 to generate the second vehicle information and signs the generated second vehicle information using the secret key of the user to generate the third vehicle information. The vehicle device 500 transmits the third vehicle information to the first server 600 through the personal authentication device 520.

The first server 600 having received the third vehicle information verifies the signature of the vehicle device 500 using the public key of the vehicle device 500 and verifies the user's signature using the public key of the user. The first server 600 decrypts the encrypted first vehicle information using the session secret key to obtain the first vehicle information.

Figure 8:
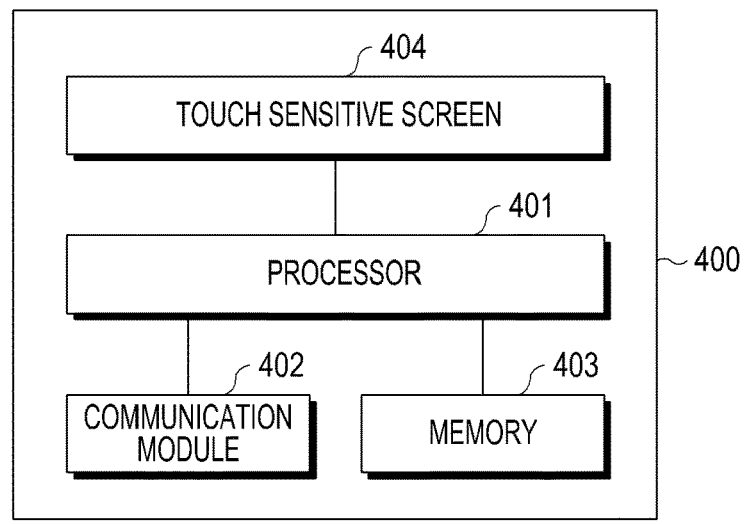
FIG. 8 is a block diagram illustrating an example electronic device according to various example embodiments of the present disclosure.

FIG. 8 is a block diagram illustrating an example electronic device according to various example embodiments of the present disclosure.

Referring to FIG. 8, the electronic device 400 may include a processor (e.g., including processing circuitry) 401, a communication module (e.g., including communication circuitry) 402, a memory 403, and a touch sensitive screen 404.

According to an embodiment, the processor 401 is connected by wire or wirelessly connected to the vehicle device 500 through the communication module 402, and is connected to a session (e.g., the first session) with the vehicle device 500. When being connected to the session, the processor 401 identifies capability information of the vehicle (or the vehicle device 500) and performs negotiation.

According to an embodiment, the processor 401 transmits the user authentication certificate to the vehicle device 500 through the communication module 402 and receives the vehicle authentication certification from the vehicle device 500. The processor 401 may verify the vehicle authentication certificate by using the public key of the vehicle device 500 obtained when the driver authentication certificate received from the authentication server (or the second server 610) is verified.

According to an embodiment, the processor 401 is connected to a session (e.g., the second session) with the vehicle device 500 for providing vehicle information and is connected to a session (e.g., the third session) with the first server 600. According to various embodiments, the processor 401 may perform user authentication (e.g., password or PIN authentication, biometric information authentication (e.g., authentication based on a fingerprint, an iris, etc.), etc.) and may be connected to the third session with the first server 600.

According to an embodiment, the processor 401 may transmit the user authentication certificate and the vehicle authentication certificate to the first server 600 through the communication module 402, and if verification of the user authentication certificate and verification of the vehicle authentication certificate have been completed by the first server 600, the processor 401 may receive the session key set encrypted using the public key of the vehicle device 500 and the signature of the first server 600, from the first server 600. The session key set may include a plurality of session keys (or at least one session key) for a session between the vehicle device 500 and the first server 600. The plurality of session keys have different validity periods and may be used based on the validity periods, respectively. For example, even if session connection between the electronic device 400 and the first server 600 and session connection between the vehicle device 500 and the electronic device 400 are released, the vehicle device 500 may encrypt the vehicle information by using the plurality of session keys based on the respective validity periods. In case of session re-connection between the electronic device 400 and the first server 600 and session re-connection between the vehicle device 500 and the electronic device 400, the vehicle device 500 may encrypt the vehicle information by using one session key of the previously stored session key set without a need for the first server 600 or the electronic device 400 to re-generate the session key. According to an embodiment, the processor 401 may transmit the received signature and encrypted session key set of the first server 600 to the vehicle device 500.

According to various embodiments, the processor 401 may receive the signature, the encrypted session key set and vehicle information policy of the first server 401 and transmit the received signature, encrypted session key set and vehicle information policy of the first server 600 to the vehicle device 500.

According to an embodiment, the processor 401 may receive the second vehicle information from the vehicle device 500 through the communication module 402. The second vehicle information may include the signature of the vehicle device 500 and the first vehicle information encrypted using the public key of one session key (e.g., the first session key) of the session key set. For example, the processor 401 receives the second vehicle information in which the first vehicle information obtained by the vehicle device 500 is encrypted using the public key of the first session key and is signed using the secret key of the vehicle device 500.

According to various embodiments, the encrypted first vehicle information may include at least partial vehicle item-specific information corresponding to the vehicle information policy of the vehicle item-specific information obtained by the vehicle device 500. According to various embodiments, the processor 401 may verify the vehicle authentication certificate using the public key of the second server 610 (e.g., the authentication server) before receiving the signature and the encrypted vehicle information of the vehicle device 500 from the vehicle device 500.

According to an embodiment, the processor 401 may transmit the third vehicle information in which the second vehicle information is signed using the secret key of the user to the first server 600 through the communication module 402. For example, the third vehicle information may include the signature of the vehicle device 500, the signature of the electronic device 400, and the encrypted plurality of IDs and vehicle item-specific information.

According to various embodiments, the processor 401 may receive the signature of the first server 600 and the session key set for the third session, which is encrypted using the public key of the electronic device 400, from the first server 600 through the communication module 402. The session key set for the third session may include a plurality of session keys for the third session between the electronic device 400 and the first server 600. The processor 401 verifies the signature of the first server 600 using the public key of the first server 600 and decrypts the encrypted session key set for the third session using the secret key of the user to obtain the session key set for the third session.

According to various embodiments, the processor 401 may receive the signature and the encrypted session key set for the third session and the encrypted vehicle information policy of the first server 600 from the first server 600. The processor 401 verifies the signature of the first server 600 using the public key of the first server 600 and decrypts the encrypted session key set for the third session and the encrypted vehicle information policy by using the secret key of the user to obtain the session key set for the third session and the vehicle information policy.

According to various embodiments, the processor 401 may generate the session key set for the second session between the electronic device 400 and the vehicle device 500 and encrypt the generated session key set for the second session by using the public key of the vehicle device 500. The processor 401 signs the encrypted session key set for the second session by using the secret key of the user and transmits the signed session key set to the vehicle device 500.

According to various embodiments, the processor 401 may receive the first-type second vehicle information and the second-type second vehicle information from the vehicle device 500 through the communication module 402. The first-type second vehicle information may include the signature of the vehicle device 500, and the plurality of IDs and first vehicle item-specific information which are encrypted using the public key (e.g., the second session public key) of one session key (e.g., the second session key) of the session key set for the second session. The second-type second vehicle information may include the signature of the vehicle device 500, and the plurality of IDs and second vehicle item-specific information which are encrypted using the second session public key.

The processor 401 verifies the signature of the vehicle device 500 regarding the second-type second vehicle information using the public key of the vehicle device 500 and decrypts the encrypted second vehicle item-specific information using the second session secret key to obtain the second vehicle item-specific information. According to various embodiments, the processor 401 may verify the signature of the vehicle device 500 regarding the first-type second vehicle information using the public key of the vehicle device 500 and decrypt the encrypted first vehicle item-specific information using the secret key of the second session key (e.g., the second session secret key) to obtain the first vehicle item-specific information. According to various embodiments, the processor 401 encrypts the obtained second vehicle item-specific information and the second session secret key using the third session public key, and signs the encrypted second vehicle item-specific information and second session secret key by using the secret key of the user to generate the third-type second vehicle information. The processor 401 transmits the third vehicle information including the first-type second vehicle information and the third-type second vehicle information to the first server 600.

According to various embodiments, the processor 401 may encrypt the obtained first vehicle item-specific information and the second session secret key using the third session public key, and sign the encrypted first vehicle item-specific information and second session secret key by using the secret key of the user to generate the third-type second vehicle information.

According to various embodiments, the processor 401 may detect at least one second vehicle item-specific information corresponding to the vehicle information policy of the obtained second vehicle item-specific information, encrypt the plurality of IDs, the detected at least one second vehicle item-specific information, and the second session secret key by using the third session public key, and sign them using the user's secret key to generate the third-type second vehicle information.

According to various embodiments, the processor 401 may perform user authentication and transmit the signature and the encrypted vehicle information of the electronic device 400 to the first server 600. For example, the processor 401 may perform user authentication, and if having completed user authentication, the processor 401 may generate the first public key and the first secret key for the signature of the electronic device 400 and transmit the generated first public key to the first server 600. The processor 401 signs the encrypted vehicle information by using the first secret key and transmits the signed vehicle information to the first server 600.

The communication module 402 may include various communication circuitry and establishes communication between the electronic device 400 and the vehicle device 500 and communication between the electronic device 400 and the first server 600. For example, the communication module 402 may communicate with the vehicle device 500 or the first server 600 through wired communication or wireless communication.

The memory 403 stores information needed for providing vehicle information. For example, the memory 403 may store the user authentication certificate received from the authentication server (or the second server 610) or/and the vehicle authentication certificate received from the vehicle device 500. The memory 403 stores the generated session key set for the first session or stores the encrypted vehicle information received from the vehicle device 500. According to various embodiments, the memory 403 may store the vehicle information policy.

The touch sensitive screen 404 receives a request (or an input) for providing the vehicle information to the first server 600, or displays an application execution screen if an application for providing the vehicle information is executed. According to various embodiments, the touch sensitive screen 404 displays content information (e.g., display information (e.g., an image, an icon, a text, video, etc.) displayed on a display provided in a vehicle) received from the vehicle device 500.

Figure 9:
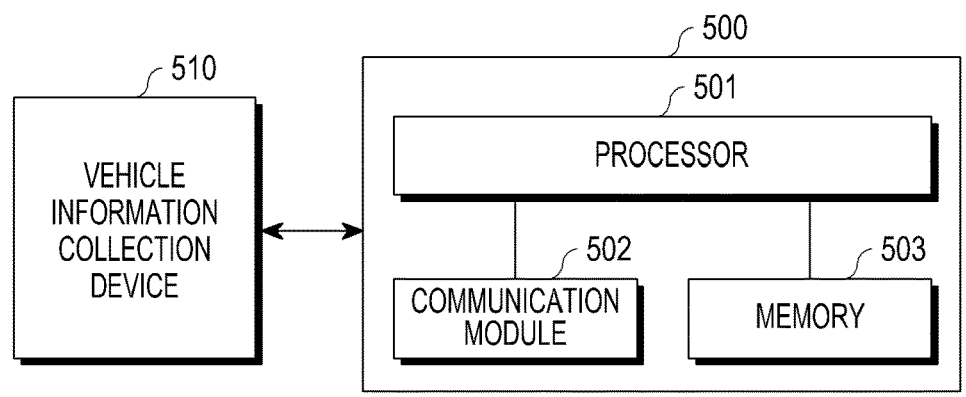
FIG. 9 is a block diagram illustrating an example vehicle device according to various example embodiments of the present disclosure.

FIG. 9 is a block diagram illustrating an example vehicle device according to various example embodiments of the present disclosure.

Referring to FIG. 9, the vehicle device 500 may include a processor (e.g., including processing circuitry) 501, a communication module (e.g., including communication circuitry) 502, and a memory 503.

According to an embodiment, the processor 501 is connected by wire or wirelessly connected to the electronic device 400 through the communication module 502, and is connected to a session (e.g., the first session) with the electronic device 400.

According to an embodiment, the processor 501 is connected to a session (e.g., the second session) with the electronic device 400 for providing the vehicle information.

According to an embodiment, the processor 501 may transmit the vehicle authentication certificate to the electronic device 400 through the communication module 502 and receive the user authentication certificate from the electronic device 400. The processor 501 verifies the user authentication certificate by using the public key of the electronic device 400 obtained when the vehicle authentication certificate received from the first server 600 is verified.

According to an embodiment, the processor 501 may receive the signature of the first server 600 and the session key set encrypted by the first server 600 using the public key of the vehicle device 500 from the electronic device 400 through the communication module 502. The session key set may include the plurality of session keys for the session between the vehicle device 500 and the first server 600. According to various embodiments, the processor 501 may receive the signature and the encrypted session key set and vehicle information policy of the first server 600 from the electronic device 400.

According to an embodiment, the processor 501 may verify the signature of the first server 600 using the public key of the first server 600 and decrypt the encrypted session public key using the secret key of the vehicle device 500 to obtain the session key set. According to various embodiments, the processor 501 may verify the signature of the first server 600 using the public key of the first server 600 and decrypt the encrypted session public key and vehicle information policy using the secret key of the vehicle device 500 to obtain the session key set and the vehicle information policy.

According to an embodiment, the processor 501 may send a request for vehicle item-specific information to a vehicle information collection device 510 and receive the vehicle item-specific information from the vehicle information collection device 510. According to various embodiments, the vehicle information collection device 510 may be provided separately from the vehicle device 500 or inside the vehicle device 500.

According to an embodiment, the processor 501 may encrypt the plurality of IDs and the vehicle item-specific information (e.g., the first vehicle information) by using the public key (e.g., the first session public key) of one session key (e.g., the first session key) of the session key set for the session with the first server 600, and transmit the second vehicle information in which the encrypted first vehicle information is signed using the secret key of the vehicle device 500, to the electronic device 400 through the communication module 502. For example, the processor 501 may transmit, to the electronic device 400, the second vehicle information in which the obtained first vehicle information is encrypted using the first session public key and is signed using the secret key of the vehicle device 500.

According to various embodiments, the processor 501 may detect at least partial vehicle item-specific information corresponding to the vehicle information policy of the vehicle item-specific information, and encrypt the first vehicle information including the plurality of IDs and the at least partial vehicle item-specific information by using the first session public key. The processor 501 transmits, to the electronic device 400, the second vehicle information in which the encrypted first vehicle information is signed using the secret key of the vehicle device 500.

According to various embodiments, the processor 501 may receive the signature of the electronic device 400 and the session key set encrypted by the electronic device 400 using the public key of the vehicle device 500 from the electronic device 400 through the communication module 502. The encrypted session key set may be generated by the electronic device 400 for the second session between the electronic device 400 and the vehicle device 500.

According to various embodiments, the processor 501 may verify the signature of the electronic device 400 using the public key of the electronic device 400 and decrypt the encrypted session public key for the second session by using the secret key of the vehicle device 500 to obtain the session key set for the second session.

According to various embodiments, the processor 501 may encrypt the first-type first vehicle information including the first vehicle item-specific information of the vehicle item-specific information obtained from the vehicle information collection device 510 and the plurality of IDs by using the public key (e.g., the second session public key) of one session key (e.g., the second session key) of the session key set for the second session, and may encrypt the second-type first vehicle information including the second vehicle item-specific information and the plurality of IDs by using the second session public key. The processor 501 generates the first-type second vehicle information in which the encrypted first-type first vehicle information is signed using the public key of the electronic device 400 and generates the second-type second vehicle information in which the encrypted second-type first vehicle information is signed using the public key of the electronic device 400. The processor 501 transmits the generated first-type second vehicle information and the generated second-type second vehicle information to the electronic device 400.

The communication module 502 establishes communication between the electronic device 400 and the vehicle device 500. For example, the communication module 502 may communicate with the electronic device 400 through wired communication or wireless communication.

The memory 503 stores information needed for providing vehicle information. For example, the memory 503 may store the vehicle authentication certificate received from the authentication server (or the second server 610) or the user authentication certificate received from the electronic device 400. The memory 503 stores the session key set generated by the first server 600, the session key set for the first session generated by the electronic device 400, or the vehicle information received from the vehicle information collection device 510.

Figure 10:
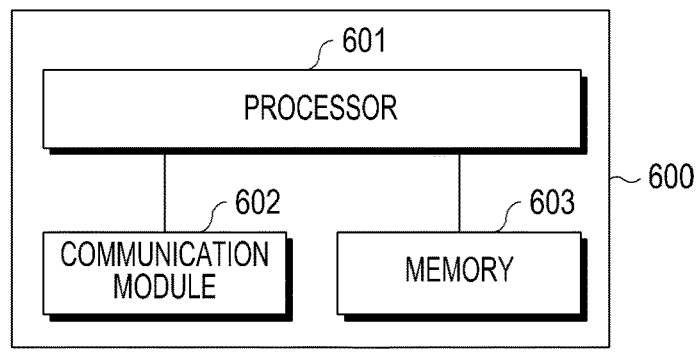
FIG. 10 is a block diagram illustrating an example first server according to various example embodiments of the present disclosure.

FIG. 10 is a block diagram illustrating an example first server according to various example embodiments of the present disclosure.

Referring to FIG. 10, the first server 600 may include a processor (e.g., including processing circuitry) 601, a communication module (e.g., including communication circuitry) 602, and a memory 603.

According to an embodiment, the processor 601 may be connected to the third session with the electronic device 400 through the communication module 602.

According to an embodiment, the processor 601 may receive the user authentication certificate and the vehicle authentication certificate from the electronic device 400 through the communication module 602 and verify the user authentication certificate and the vehicle authentication certificate by using the public key of the first server 600.

According to an embodiment, the processor 601 may generate the session key set for the session with the vehicle device 500, encrypt the generated session key set by using the public key of the vehicle device 500, and transmit the encrypted session key set to the electronic device 400.

According to various embodiments, the processor 601 may encrypt the session key set and the vehicle information policy by using the public key of the vehicle device 500 and transmit the encrypted session key set and vehicle information policy to the electronic device 400.

According to an embodiment, the processor 601 may receive the third vehicle information from the electronic device 400 through the communication module 602. The third vehicle information may include the signature of the vehicle device 500, the signature of the electronic device 400 (or the user), and the first vehicle information encrypted using the public key (e.g., the first session public key) of one session key (e.g., the first session key) of the session key set. For example, the processor 601 receives, from the electronic device 400, the third vehicle information in which the electronic device 400 signs, by using the secret key of the user, the second vehicle information in which the vehicle device 500 encrypts the first vehicle information of the vehicle device 500 using the secret key of the first session key.

According to various embodiments, the encrypted first vehicle information may include at least partial vehicle item-specific information corresponding to the vehicle information policy of the vehicle item-specific information obtained by the vehicle device 500.

According to an embodiment, the processor 601 may verify the signature of the vehicle device 500 using the public key of the vehicle device 500 and may verify the signature of the electronic device 400 (or the user) using the public key of the electronic device 400 (or the user).

According to an embodiment, the processor 601 may decrypt the encrypted vehicle information using the secret key (e.g., the first session secret key) of the first session key to obtain the vehicle information.

According to various embodiments, the processor 601 may generate the session key set for the third session between the electronic device 400 and the first server 600 and encrypt the generated session key set by using the public key of the electronic device 400. The processor 601 signs the encrypted session key set for the third session by using the secret key of the first server 600 and transmits the signature of the first server 600 and the encrypted session key set for the second session to the electronic device 400 through the communication module 602.

According to various embodiments, the processor 601 may encrypt the session key set for the third session and the vehicle information policy by using the public key of the electronic device 400 (or the user), sign the encrypted session key set and vehicle information policy using the secret key of the first server 600, and transmit the signed session key set and vehicle information policy to the electronic device 400. According to various embodiments, the processor 601 may receive the third vehicle information including the first-type second vehicle information and the second-type second vehicle information from the electronic device 400 through the communication module 602. The processor 601 verifies the signature of the vehicle device 500 included in the first-type second vehicle information using the public key of the vehicle device 500 and verifies the signature of the electronic device 400 (or the user) included in the second-type second vehicle information by using the public key of the electronic device 400 (or the user). For example, the second-type second vehicle information may include the encrypted second-type first vehicle information and second session secret key.

The processor 601 decrypts the encrypted second-type first vehicle information and second session secret key using the third session secret key to obtain the second-type first vehicle information and the second session secret key. The processor 601 decrypts the encrypted first-type first vehicle information using the obtained second session secret key to obtain the first-type first vehicle information.

According to various embodiments, the first-type first vehicle information may include at least partial first vehicle item-specific information corresponding to the vehicle information policy of the obtained first vehicle item-specific information. The second-type second vehicle information may include at least partial second vehicle item-specific information corresponding to the vehicle information policy of the obtained second vehicle item-specific information.

The communication module 602 establishes communication between the electronic device 400 and the first server 600. For example, the communication module 602 may communicate with the electronic device 400 through wired communication or wireless communication.

The memory 603 stores information needed for providing vehicle information. For example, the memory 603 may store the session key set for the third session between the electronic device 400 and the first server 600 or store the session key set for the session between the vehicle device 500 and the first server 600. The memory 603 stores the public key of the vehicle device 500 and the public key of the electronic device 400 or stores the obtained vehicle information. According to various embodiments, the memory 603 may store the vehicle information policy.

Figure 11:
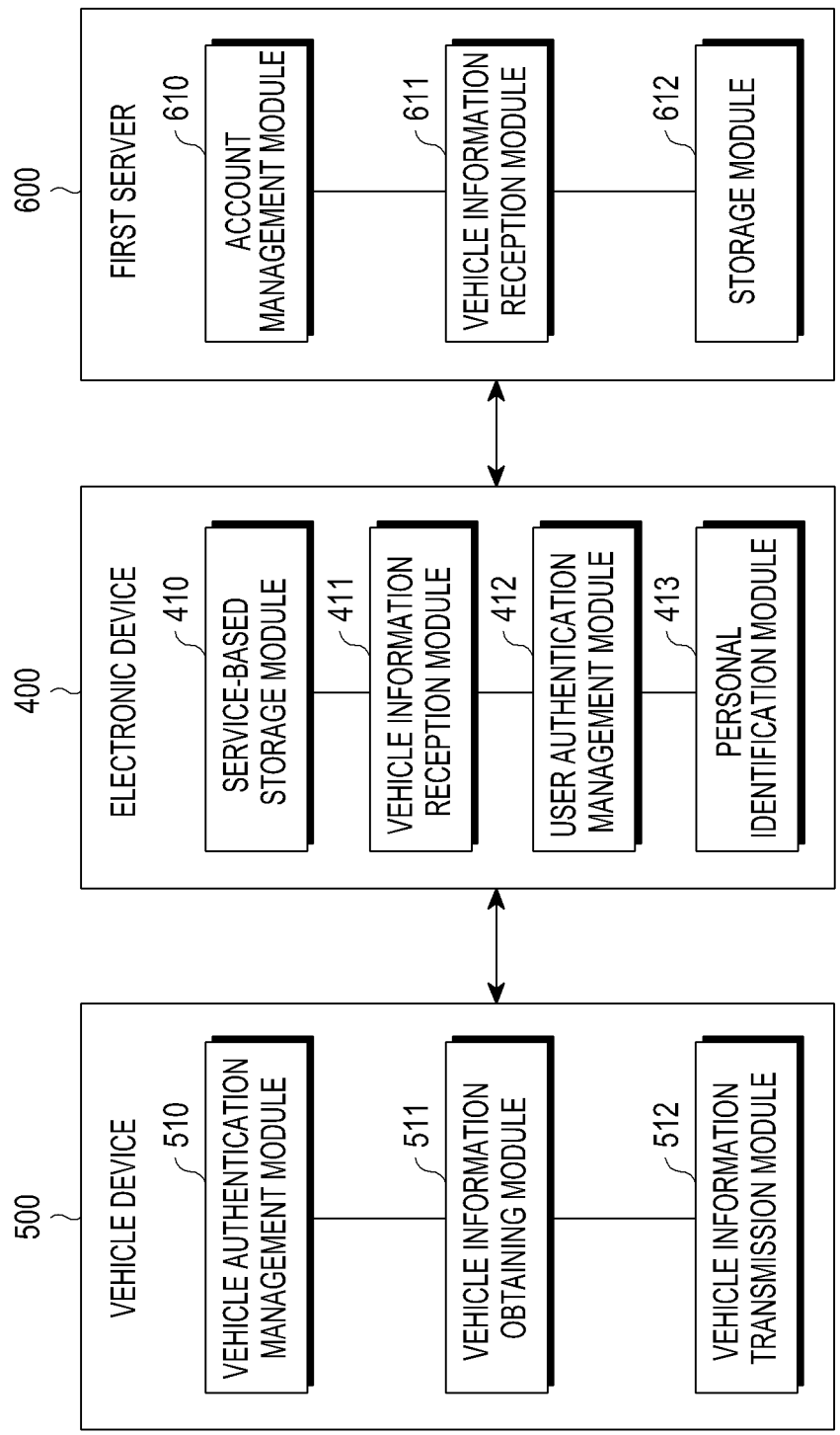
FIG. 11 is a diagram illustrating an example of an electronic device, a vehicle device, and a first server according to various example embodiments of the present disclosure.

FIG. 11 is a diagram illustrating examples of an electronic device, a vehicle device, and a first server according to various example embodiments of the present disclosure.

Referring to FIG. 11, the electronic device 400 may include a service-based storage module 410 that stores service-related information (e.g., the key pair of the electronic device 400, the key pair of the user, the electronic device authentication certificate, the user authentication certificate, the vehicle information policy, etc.), a vehicle information reception module 411 that receives the vehicle information from the vehicle device 500, a user authentication module 412 that performs user authentication, and a personal identification module 413 that identifies the user. Each of the modules may include various circuitry or program elements configured to achieve the various functions performed by the various modules. The service-based storage module 410 may be implemented as being included in the memory 403 of FIG. 8 to operate at least similarly with the memory 403. The vehicle information reception module 411 may be implemented as being included in the communication module 402 of FIG. 8 to operate at least similarly with the communication module 402. The user authentication module 412 and the personal identification module 413 may be implemented as being included in the processor 401 of FIG. 8 to operate at least similarly with the processor 401.

According to an embodiment, the vehicle device 500 may include a vehicle information transmission module 512 that transmits the vehicle information, a vehicle authentication management module 510 that performs vehicle authentication, and a vehicle information obtaining module 511 that obtains the vehicle information. Each of the modules may include various circuitry or program elements configured to achieve the various functions performed by the various modules. The vehicle information transmission module 513 may be implemented as being included in the communication module 502 of FIG. 9 to operate at least similarly with the communication module 502. The vehicle authentication management module 510 and the vehicle information obtaining module 511 may be implemented as being included in the processor 501 of FIG. 9 to operate at least similarly with the processor 501.

According to an embodiment, the first server 600 may include an account management module 610 that manages user personal information, a vehicle information reception module 611 that receives the vehicle information, and a storage module 612 that stores service-related information. Each of the modules may include various circuitry or program elements configured to achieve the various functions performed by the various modules. The account management module 610 may be implemented as being included in the processor 601 of FIG. 10 to operate at least similarly with the processor 601. The vehicle information reception module 611 may be implemented as being included in the communication module 602 of FIG. 10 to operate similarly with the communication module 602. The storage module 612 may be implemented as being included in the memory 603 of FIG. 10 to operate at least similarly with the memory 603.

Figure 12:
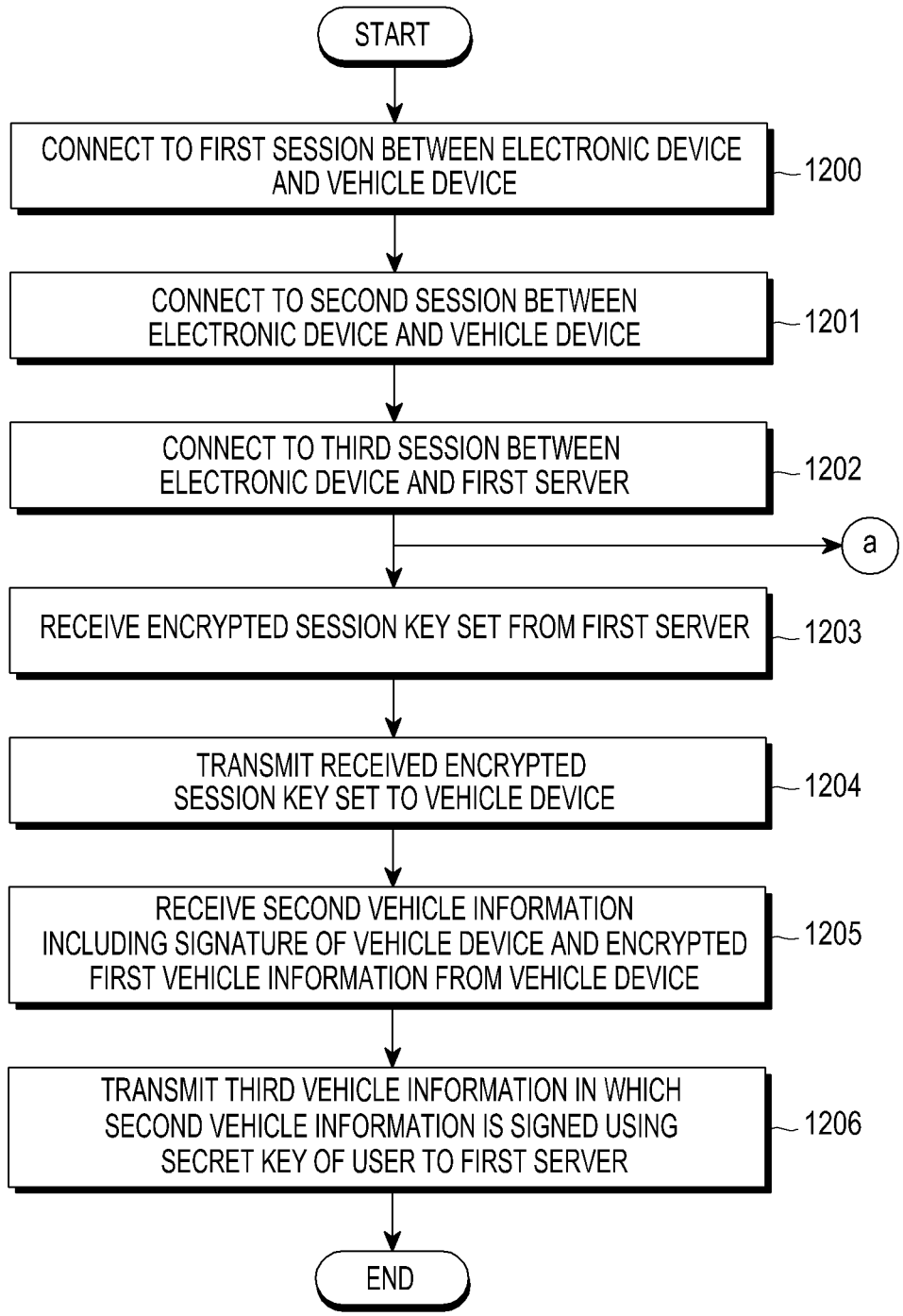
FIG. 12 is a flowchart illustrating an example method for providing vehicle information in an electronic device according to various example embodiments of the present disclosure.

FIG. 12 is a flowchart illustrating an example method for providing vehicle information in an electronic device according to various example embodiments of the present disclosure.

According to various embodiments, operations 1200 through 1206 may be executed by any one of the electronic device 101, 201, or 400, the first server 600, the processor 120, 210, 401, 501, or 601, the programming module 310, the vehicle device 500, the external device 700, the first external device 800, and the second external device 900.

Referring to FIG. 12, in operation 1200, the electronic device 400 (e.g., the processor 401) is connected to the first session between the electronic device 400 and the vehicle device 500. For example, the electronic device 400 (e.g., the processor 401) may be connected by wire or wirelessly connected to the vehicle device 500.

In operation 1201, the electronic device 400 (e.g., the processor 401) is connected to the second session between the electronic device 400 and the vehicle device 500. For example, when being connected to the session, the processor 401 may identify capability information of the vehicle (or the vehicle device 500) and perform negotiation.

According to an embodiment, the electronic device 400 (e.g., the processor 401) may transmit the user authentication certificate (or the electronic device authentication certificate) to the vehicle device 500 and may receive the vehicle authentication certification from the vehicle device 500. The electronic device 400 (e.g., the processor 401) verifies the vehicle authentication certificate by using the public key of the vehicle device 500 obtained when the driver authentication certificate received from the authentication server (or the second server 610) is verified.

In operation 1202, the electronic device 400 (e.g., the processor 401) is connected to the third session between the electronic device 400 and the first server 600. According to various embodiments, the electronic device 400 (e.g., the processor 401) may perform user authentication and may be connected to the session with the first server 600.

In operation 1203, the electronic device 400 (e.g., the processor 401) receives the encrypted session key set from the first server 600. For example, the electronic device 400 (e.g., the processor 401) may transmit the user authentication certificate and the vehicle authentication certificate to the first server 600, and if verification of the user authentication certificate and verification of the vehicle authentication certificate have been completed by the first server 600, the electronic device 400 may receive the session key set encrypted using the public key of the vehicle device 500 and the signature of the first server 600, from the first server 600.

In operation 1204, the electronic device 400 (e.g., the processor 401) transmits the received encrypted session key set to the vehicle device 500.

In operation 1205, the electronic device 400 (e.g., the processor 401) receives the second vehicle information including the signature and the encrypted first vehicle information of the vehicle device 500 from the vehicle device 500. For example, the electronic device 400 (e.g., the processor 401) may receive, from the vehicle device 500, the second vehicle information in which the first vehicle information (or vehicle information) of the vehicle device 500 is encrypted using the public key of the first session key and is signed using the secret key of the vehicle device 500.

In operation 1206, the electronic device 400 (e.g., the processor 401) transmits the third vehicle information in which the second vehicle information is signed using the secret key of the user to the first server 600.

Figure 13:
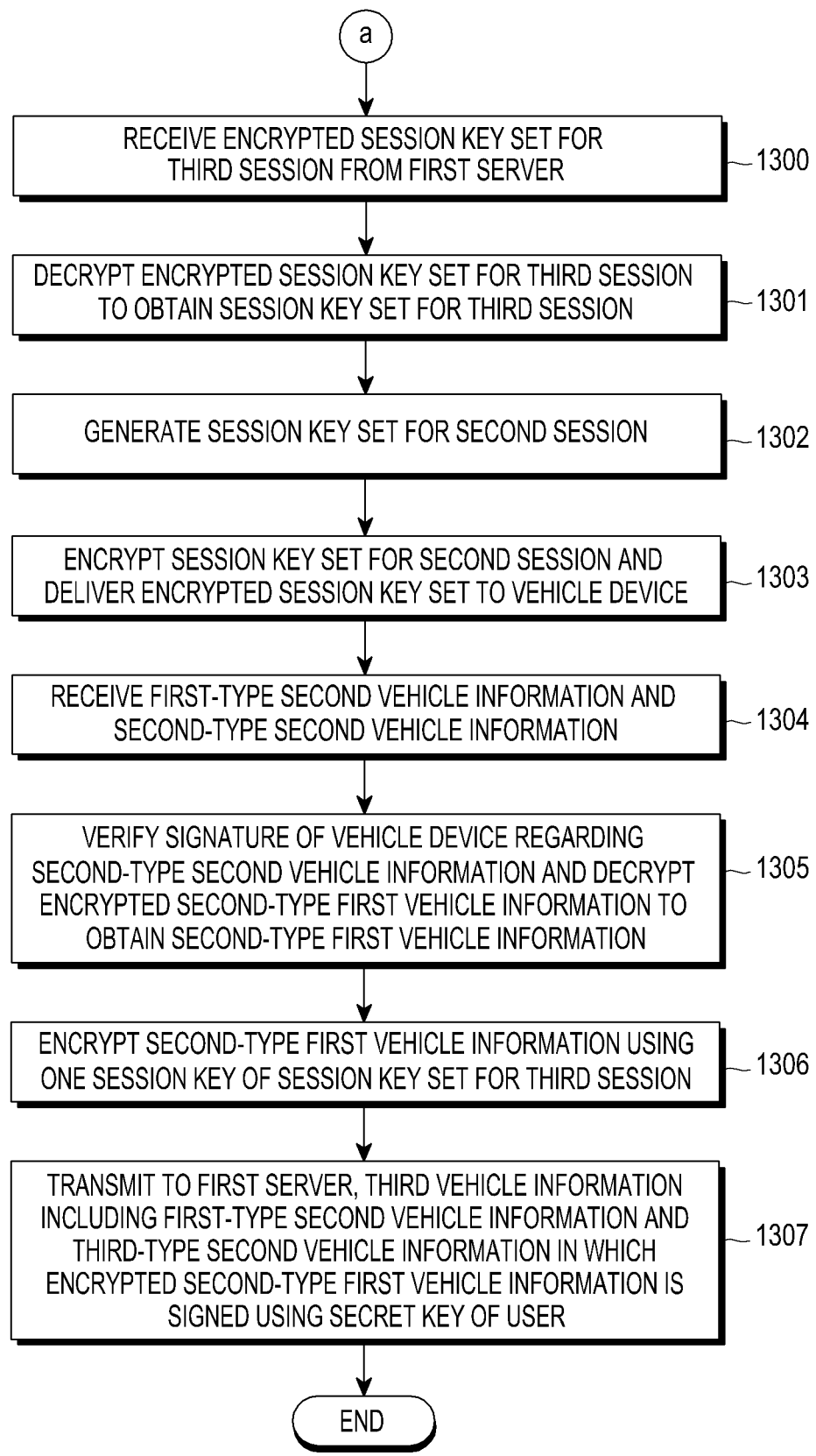
FIG. 13 is a flowchart illustrating an example method for providing vehicle information in an electronic device according to various example embodiments of the present disclosure.

FIG. 13 is a flowchart illustrating an example method for providing vehicle information in an electronic device according to various example embodiments of the present disclosure.

According to various embodiments, operations 1300 through 1307 may be executed by any one of the electronic device 101, 201, or 400, the first server 600, the processor 120, 210, 401, 501, or 601, the programming module 310, the vehicle device 500, the external device 700, the first external device 800, and the second external device 900.

Referring to FIG. 13, in operation 1300, the electronic device 400 (e.g., the processor 401) connected to the first session and the second session between the electronic device 400 and the vehicle device 500, and the third session between the electronic device 400 and the first server 600 receives the encrypted session key set for the third session from the first server 600.

In operation 1301, the electronic device 400 (e.g., the processor 401) decrypts the encrypted session key set for the third session to obtain the session key set for the third session.

In operation 1302, the electronic device 400 (e.g., the processor 401) generates the session key set for the second session.

In operation 1303, the electronic device 400 (e.g., the processor 401) encrypts the session key set for the second session and transmits the encrypted session key set to the vehicle device 500. For example, the electronic device 400 (e.g., the processor 401) may encrypt the generated session key set for the second session by using the public key of the vehicle device 500, sign the encrypted session key set for the second session using the secret key of the user, and transmit the signed session key set to the vehicle device 500.

In operation 1304, the electronic device 400 (e.g., the processor 401) receives the first-type second vehicle information and the second-type second vehicle information from the vehicle device 500. For example, the electronic device 400 (e.g., the processor 401) may receive, from the vehicle device 500, the first-type second vehicle information in which the first-type first vehicle information (e.g., the plurality of IDs and the first vehicle item-specific information) of the vehicle device 500 is encrypted using the second session public key and is signed using the secret key of the vehicle device 500 and the second-type second vehicle information in which the second-type first vehicle information (e.g., the plurality of IDs and the second vehicle item-specific information) of the vehicle device 500 is encrypted using the second session public key and is signed using the secret key of the vehicle device 500.

In operation 1305, the electronic device 400 (e.g., the processor 401) verifies the signature of the vehicle device 500 regarding the second-type second vehicle information and decrypts the encrypted second-type first vehicle information to obtain the second-type first vehicle information.

In operation 1306, the electronic device 400 (e.g., the processor 401) encrypts the second-type first vehicle information using one session key of the session key set for the third session.

In operation 1307, the electronic device 400 (e.g., the processor 401) transmits, to the first server 600, the third vehicle information including the first-type second vehicle information and the third-type second vehicle information in which the encrypted second-type first vehicle information is signed using the user's secret key.

According to various embodiments, the electronic device (e.g., the processor 401) may perform user authentication, and if having completed user authentication, the electronic device 400 may generate the first public key and the first secret key for the signature of the electronic device 400 to transmit the generated first public key to the first server 600.

Figure 14:
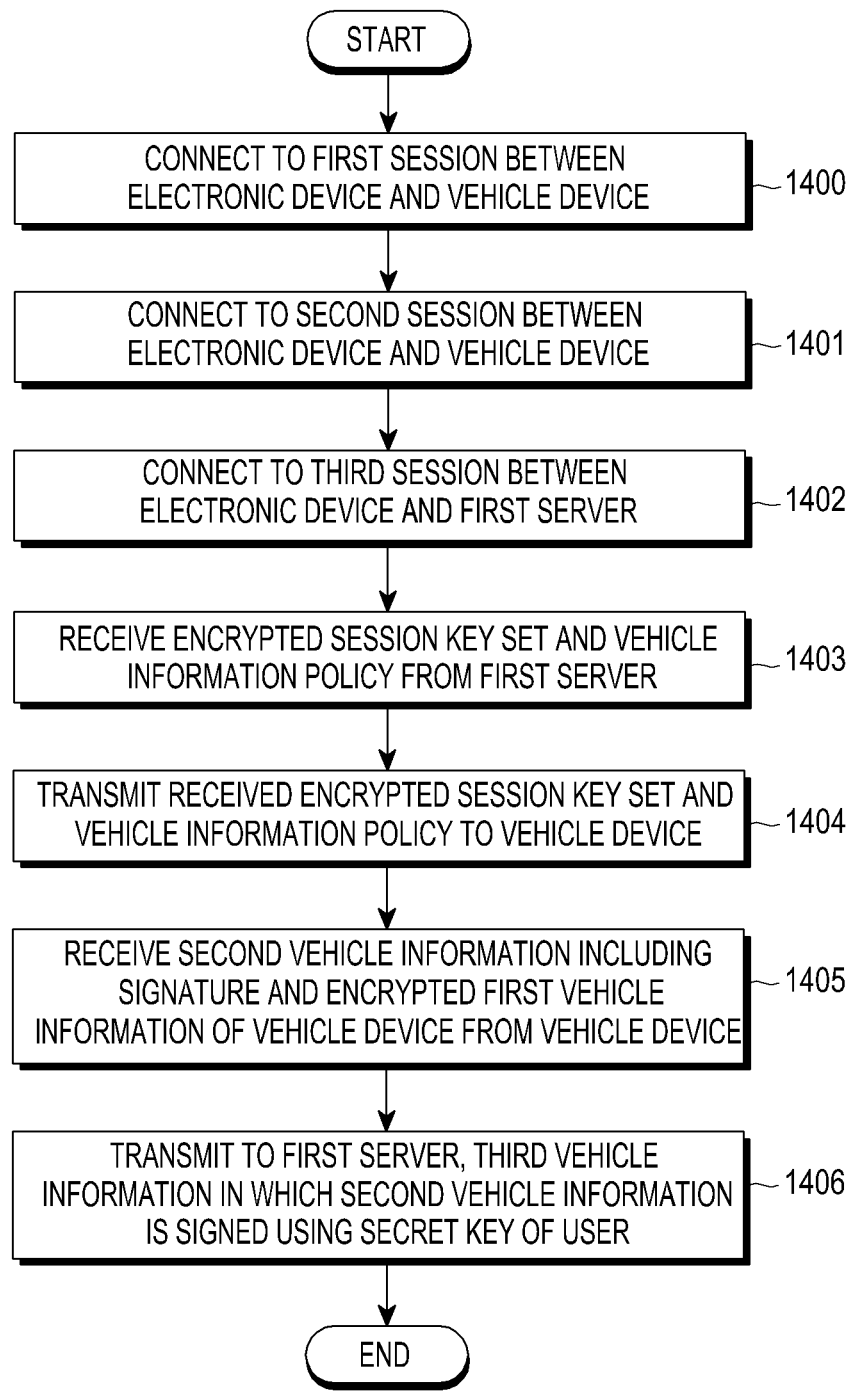
FIG. 14 is a flowchart illustrating an example method for providing vehicle information in an electronic device according to various example embodiments of the present disclosure.

FIG. 14 is a flowchart illustrating an example method for providing vehicle information in an electronic device according to various example embodiments of the present disclosure.

According to various embodiments, operations 1400 through 1406 may be executed by any one of the electronic device 101, 201, or 400, the first server 600, the processor 120, 210, 401, 501, or 601, the programming module 310, the vehicle device 500, the external device 700, the first external device 800, and the second external device 900.

Referring to FIG. 14, in operation 1400, the electronic device 400 (e.g., the processor 401) is connected to the first session between the electronic device 400 and the vehicle device 500.

In operation 1401, the electronic device 400 (e.g., the processor 401) is connected to the second session between the electronic device 400 and the vehicle device 500.

In operation 1402, the electronic device 400 (e.g., the processor 401) is connected to the third session between the electronic device 400 and the first server 600.

In operation 1403, the electronic device 400 (e.g., the processor 401) receives the encrypted session key set and vehicle information policy from the first server 600.

In operation 1404, the electronic device 400 (e.g., the processor 401) transmits the received encrypted session key set and vehicle information policy to the vehicle device 500.

In operation 1405, the electronic device 400 (e.g., the processor 401) receives the second vehicle information including the signature and the encrypted first vehicle information of the vehicle device 500 from the vehicle device 500. The encrypted first vehicle information may include at least partial vehicle item-specific information corresponding to the vehicle information policy, detected by the vehicle device 500.

In operation 1406, the electronic device 400 (e.g., the processor 401) transmits the third vehicle information in which the second vehicle information is signed using the secret key of the user to the first server 600.

Figure 15:
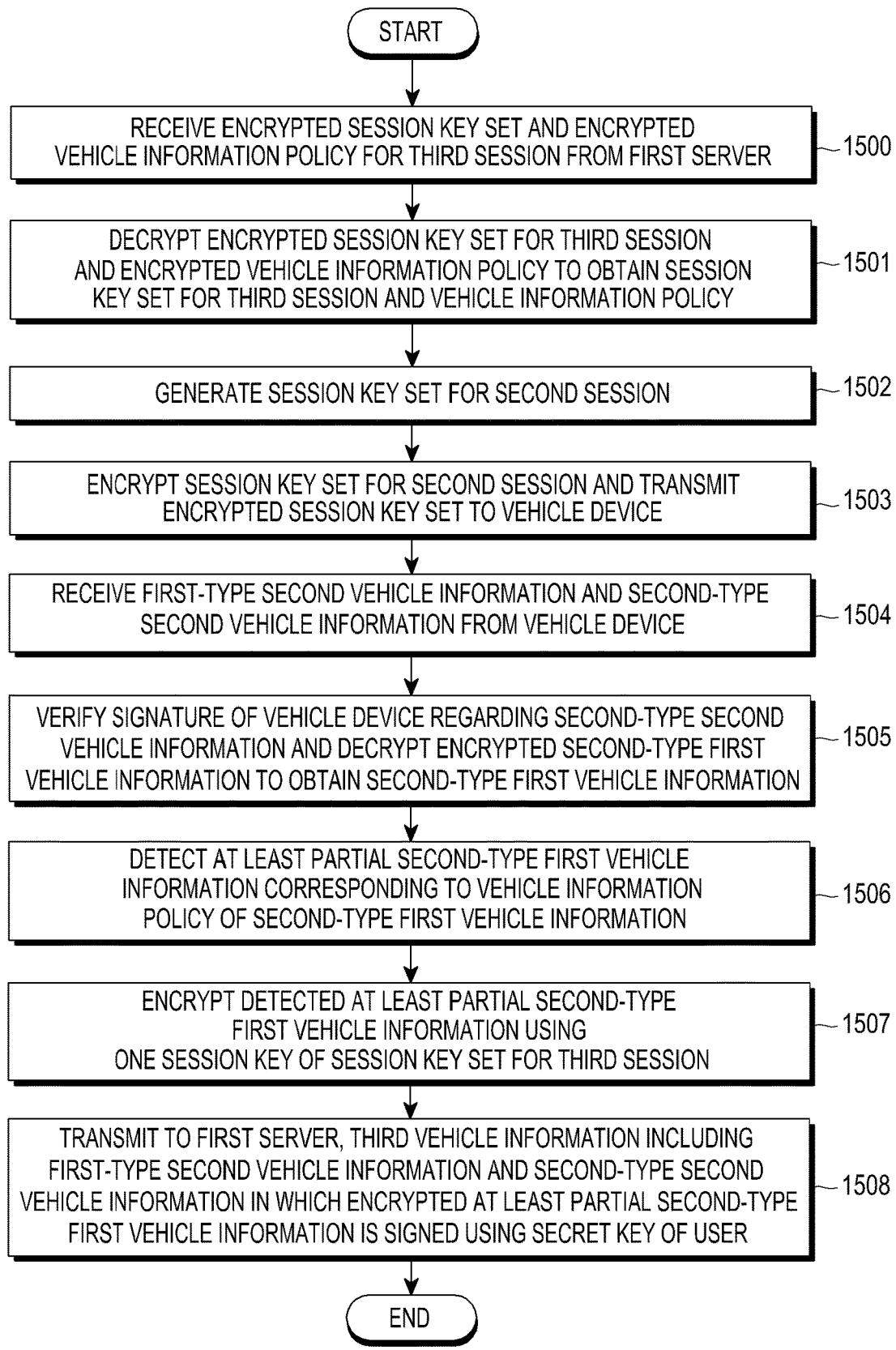
FIG. 15 is a flowchart illustrating an example method for providing vehicle information in an electronic device according to various example embodiments of the present disclosure.

FIG. 15 is a flowchart illustrating an example method for providing vehicle information in an electronic device according to various example embodiments of the present disclosure.

According to various embodiments, operations 1500 through 1508 may be executed by any one of the electronic device 101, 201, or 400, the first server 600, the processor 120, 210, 401, 501, or 601, the programming module 310, the vehicle device 500, the external device 700, the first external device 800, and the second external device 900.

Referring to FIG. 15, in operation 1500, the electronic device 400 (e.g., the processor 401) connected to the first session and the second session between the electronic device 400 and the vehicle device 500, and the third session between the electronic device 400 and the first server 600 receives the encrypted session key set and vehicle information policy for the third session from the first server 600.

In operation 1501, the electronic device 400 (e.g., the processor 401) decrypts the encrypted session key set for the third session and the encrypted vehicle information policy to obtain the session key set for the third session and the vehicle information policy.

In operation 1502, the electronic device 400 (e.g., the processor 401) generates the session key set for the second session.

In operation 1503, the electronic device 400 (e.g., the processor 401) encrypts the session key set for the second session and transmits the encrypted session key set to the vehicle device 500.

In operation 1504, the electronic device 400 (e.g., the processor 401) receives the first-type second vehicle information and the second-type second vehicle information from the vehicle device 500.

In operation 1505, the electronic device 400 (e.g., the processor 401) verifies the signature of the vehicle device 500 regarding the second-type second vehicle information and decrypts the encrypted second-type first vehicle information to obtain the second-type first vehicle information.

In operation 1506, the electronic device 400 (e.g., the processor 401) detects at least partial second-type first vehicle information corresponding to the vehicle information policy of the second-type first vehicle information.

In operation 1507, the electronic device 400 (e.g., the processor 401) encrypts the detected at least partial second-type first vehicle information using one session key of the session key set for the third session.

In operation 1508, the electronic device 400 (e.g., the processor 401) transmits, to the first server 600, the third vehicle information including the second-type second vehicle information in which the encrypted at least partial second-type first vehicle information is signed using the user's secret key and including the first-type second vehicle information.

Figure 16:
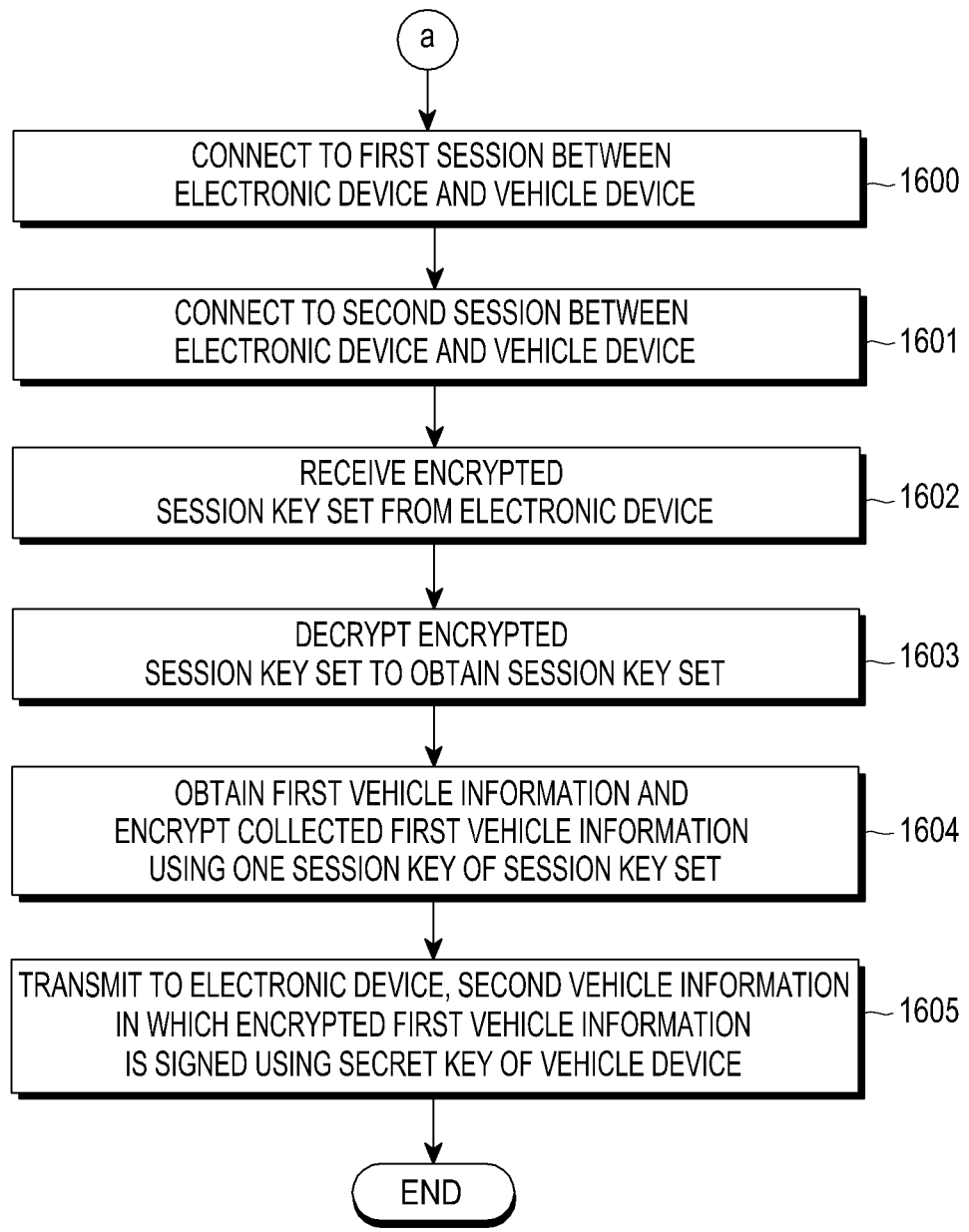
FIG. 16 is a flowchart illustrating an example method for providing vehicle information in a vehicle device according to various example embodiments of the present disclosure.

FIG. 16 is a flowchart illustrating an example method for providing vehicle information in a vehicle device according to various example embodiments of the present disclosure.

According to various embodiments, operations 1600 through 1605 may be executed by any one of the electronic device 101, 201, or 400, the first server 600, the processor 120, 210, 401, 501, or 601, the programming module 310, the vehicle device 500, the external device 700, the first external device 800, and the second external device 900.

Referring to FIG. 16, in operation 1600, the vehicle device 500 (e.g., the processor 501) is connected to the first session between the electronic device 400 and the vehicle device 500. According to an embodiment, the vehicle device 500 (e.g., the processor 501) is connected by wire or wirelessly connected to the electronic device 400 and is connected to the first session with the electronic device 400. The vehicle device (e.g., the processor 501) transmits the vehicle authentication certificate to the electronic device 400 and receives the user authentication certificate from the electronic device 400. The processor 501 verifies the user authentication certificate by using the public key of the electronic device 400 (or the user) obtained when the vehicle authentication certificate received from the authentication server (or the second server 610) is verified.

In operation 1601, the vehicle device 500 (e.g., the processor 501) is connected to the second session between the electronic device 400 and the vehicle device 500. The second session may be a session for transmitting and receiving the vehicle information.

In operation 1602, the vehicle device 500 (e.g., the processor 501) receives the encrypted session key set from the electronic device 400. According to an embodiment, the session key set may include the plurality of session keys for the session with the first server 600.

In operation 1603, the vehicle device 500 (e.g., the processor 501) decrypts the encrypted session key set to obtain the session key set. According to an embodiment, the vehicle device 500 (e.g., the processor 501) may verify the signature of the first server 600 using the public key of the first server 600 and decrypt the encrypted session key set using the secret key of the vehicle device 500 to obtain the session key set.

In operation 1604, the vehicle device 500 (e.g., the processor 501) obtains the first vehicle information and encrypts the obtained first vehicle information using one session key of the session key set. According to an embodiment, the vehicle device 500 (e.g., the processor 501) may obtain the first vehicle information or send a request for the vehicle information to a device for obtaining the first vehicle information (e.g., the vehicle information collection device 510) and receive the first vehicle information. For example, the first vehicle information may include the plurality of IDs and the vehicle item-specific information. The vehicle device 500 (e.g., the processor 501) encrypts the first vehicle information using the public key (e.g., the session public key) for one session key of the session key set.

In operation 1605, the vehicle device 500 (e.g., the processor 501) transmits the second vehicle information in which the encrypted first vehicle information is signed using the secret key of the vehicle device 500 to the electronic device 400.

According to various embodiments, the vehicle device 500 (e.g., the processor 501) may transmit, to the electronic device 400, the second vehicle information in which the obtained first vehicle information of the vehicle device 500 is encrypted using the public key of the first session key and is signed using the secret key of the vehicle device 500.

Figure 17:
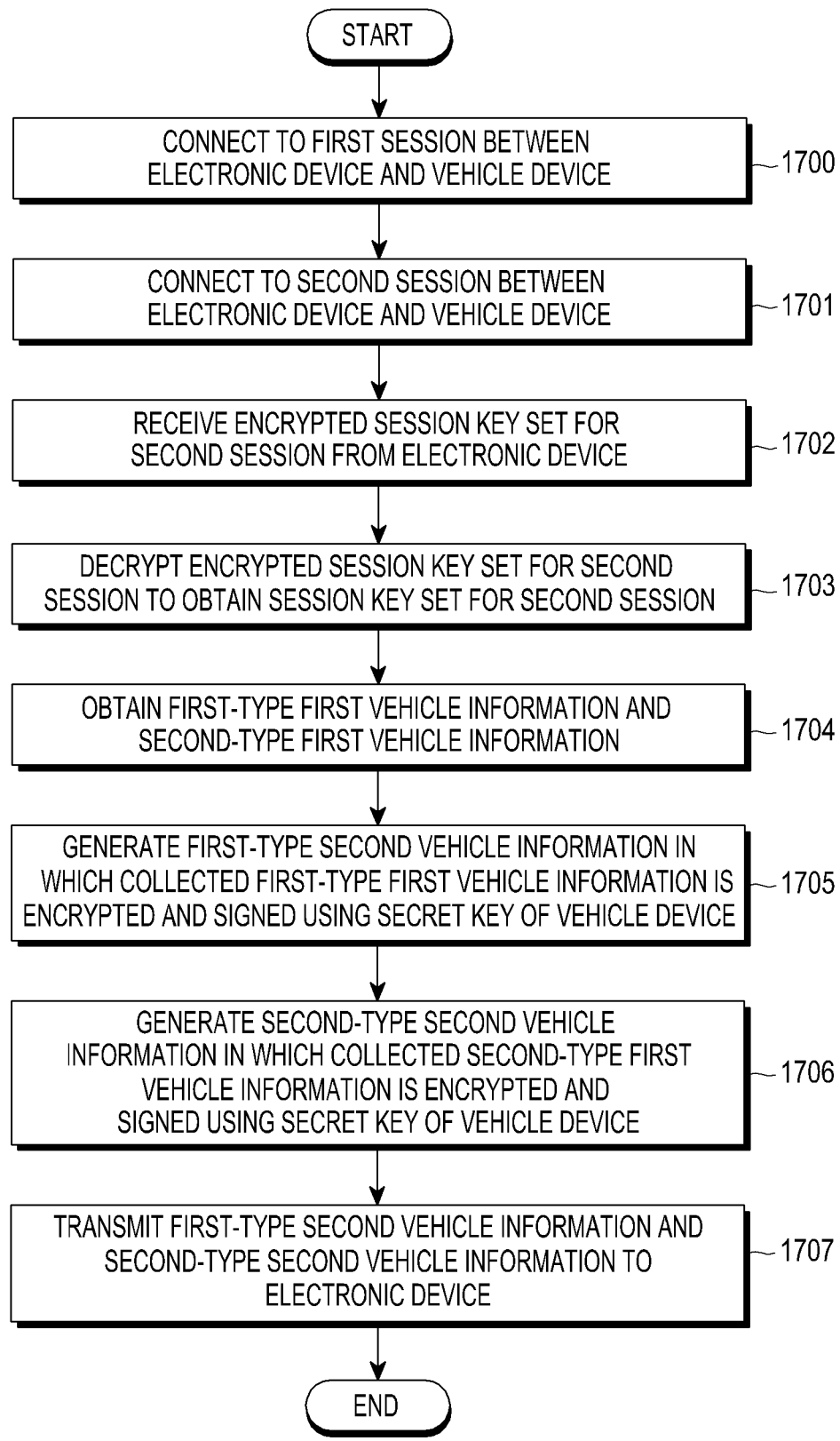
FIG. 17 is a flowchart illustrating an example method for providing vehicle information in a vehicle device according to various example embodiments of the present disclosure.

FIG. 17 is a flowchart illustrating an example method for providing vehicle information in a vehicle device according to various example embodiments of the present disclosure.

According to various embodiments, operations 1700 through 1705 may be executed by any one of the electronic device 101, 201, or 400, the first server 600, the processor 120, 210, 401, 501, or 601, the programming module 310, the vehicle device 500, the external device 700, the first external device 800, and the second external device 900.

Referring to FIG. 17, in operation 1700, the vehicle device 500 (e.g., the processor 501) is connected to the first session between the electronic device 400 and the vehicle device 500.

In operation 1701, the vehicle device 500 (e.g., the processor 501) is connected to the second session between the electronic device 400 and the vehicle device 500.

In operation 1702, the vehicle device 500 (e.g., the processor 501) receives the encrypted session key set for the second session from the electronic device 400.

In operation 1703, the vehicle device 500 (e.g., the processor 501) decrypts the encrypted session key set for the second session to obtain the session key set for the second session.

In operation 1704, the vehicle device 500 (e.g., the processor 501) obtains the first-type first vehicle information and the second-type first vehicle information. According to various embodiments, the vehicle device 500 (e.g., the processor 501) may receive the first-type first vehicle information and the second-type first vehicle information from the vehicle information collection device 510.

In operation 1705, the vehicle device 500 (e.g., the processor 501) generates the first-type second vehicle information in which the obtained first-type first vehicle information is encrypted and is signed using the secret key of the vehicle device 500.

In operation 1706, the vehicle device 500 (e.g., the processor 501) generates the second-type second vehicle information in which the obtained second-type first vehicle information is encrypted and is signed using the secret key of the vehicle device 500.

In operation 1707, the vehicle device 500 (e.g., the processor 501) transmits the first-type second vehicle information and the second-type second vehicle information to the electronic device 400.

Figure 18:
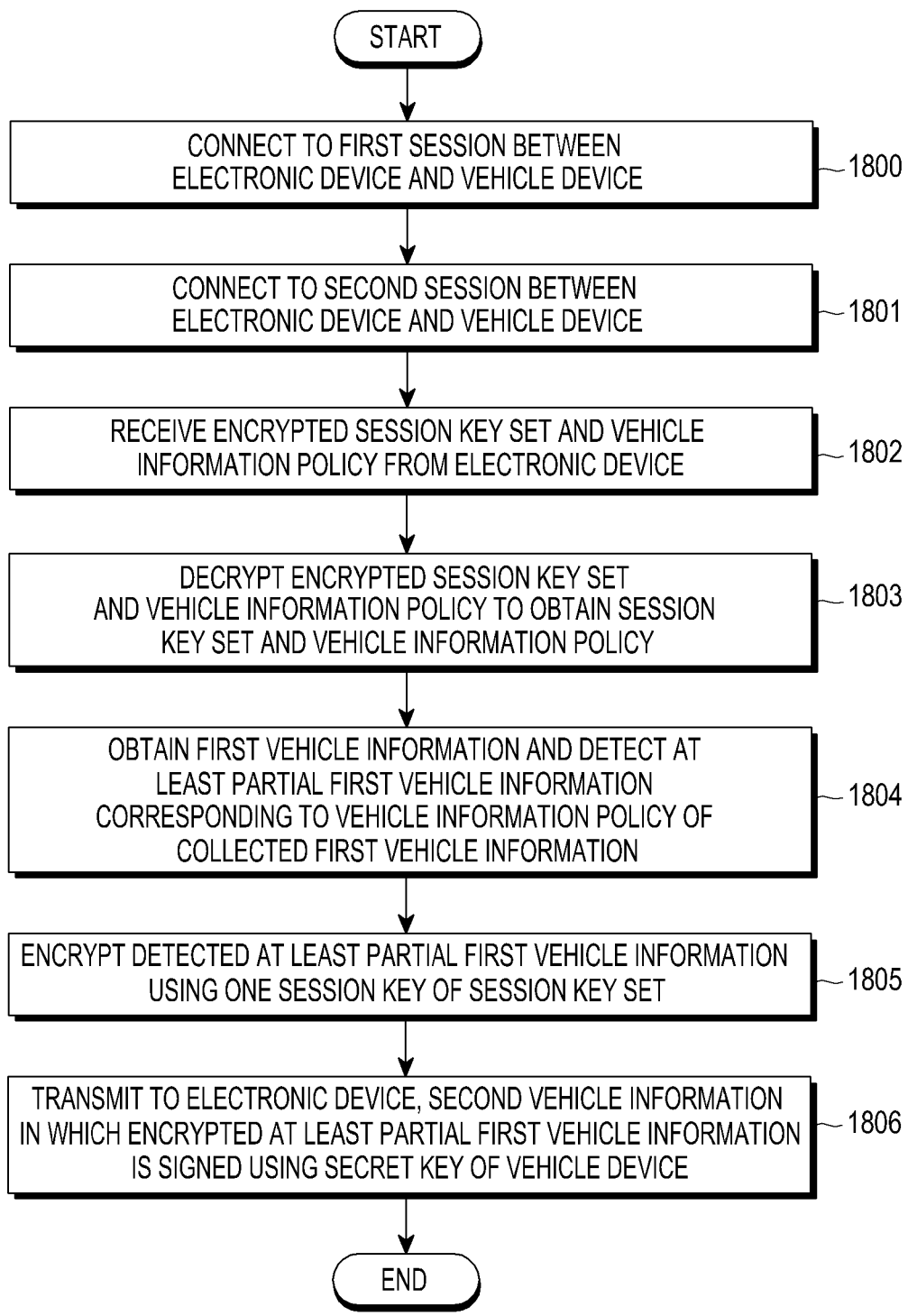
FIG. 18 is a flowchart illustrating an example method for providing vehicle information in a vehicle device according to various example embodiments of the present disclosure.

FIG. 18 is a flowchart illustrating an example method for providing vehicle information in a vehicle device according to various example embodiments of the present disclosure.

According to various embodiments, operations 1800 through 1806 may be executed by any one of the electronic device 101, 201, or 400, the first server 600, the processor 120, 210, 401, 501, or 601, the programming module 310, the vehicle device 500, the external device 700, the first external device 800, and the second external device 900.

Referring to FIG. 18, in operation 1800, the vehicle device 500 (e.g., the processor 501) is connected to the first session between the electronic device 400 and the vehicle device 500.

In operation 1801, the vehicle device 500 (e.g., the processor 501) is connected to the second session between the electronic device 400 and the vehicle device 500.

In operation 1802, the vehicle device 500 (e.g., the processor 501) receives the encrypted session key set and vehicle information policy from the electronic device 400.

In operation 1803, the vehicle device 500 (e.g., the processor 501) decrypts the encrypted session key set and vehicle information policy to obtain the session key set and the vehicle information policy.

In operation 1804, the vehicle device 500 (e.g., the processor 501) obtains the first vehicle information and detects at least partial first vehicle information corresponding to the vehicle information policy of the obtained first vehicle information.

In operation 1805, the vehicle device 500 (e.g., the processor 501) encrypts the detected at least partial first vehicle information using one session key of the session key set.

In operation 1806, the vehicle device 500 (e.g., the processor 501) transmits the second vehicle information in which the encrypted at least partial first vehicle information is signed using the secret key of the vehicle device 500 to the electronic device 400.

Figure 19:
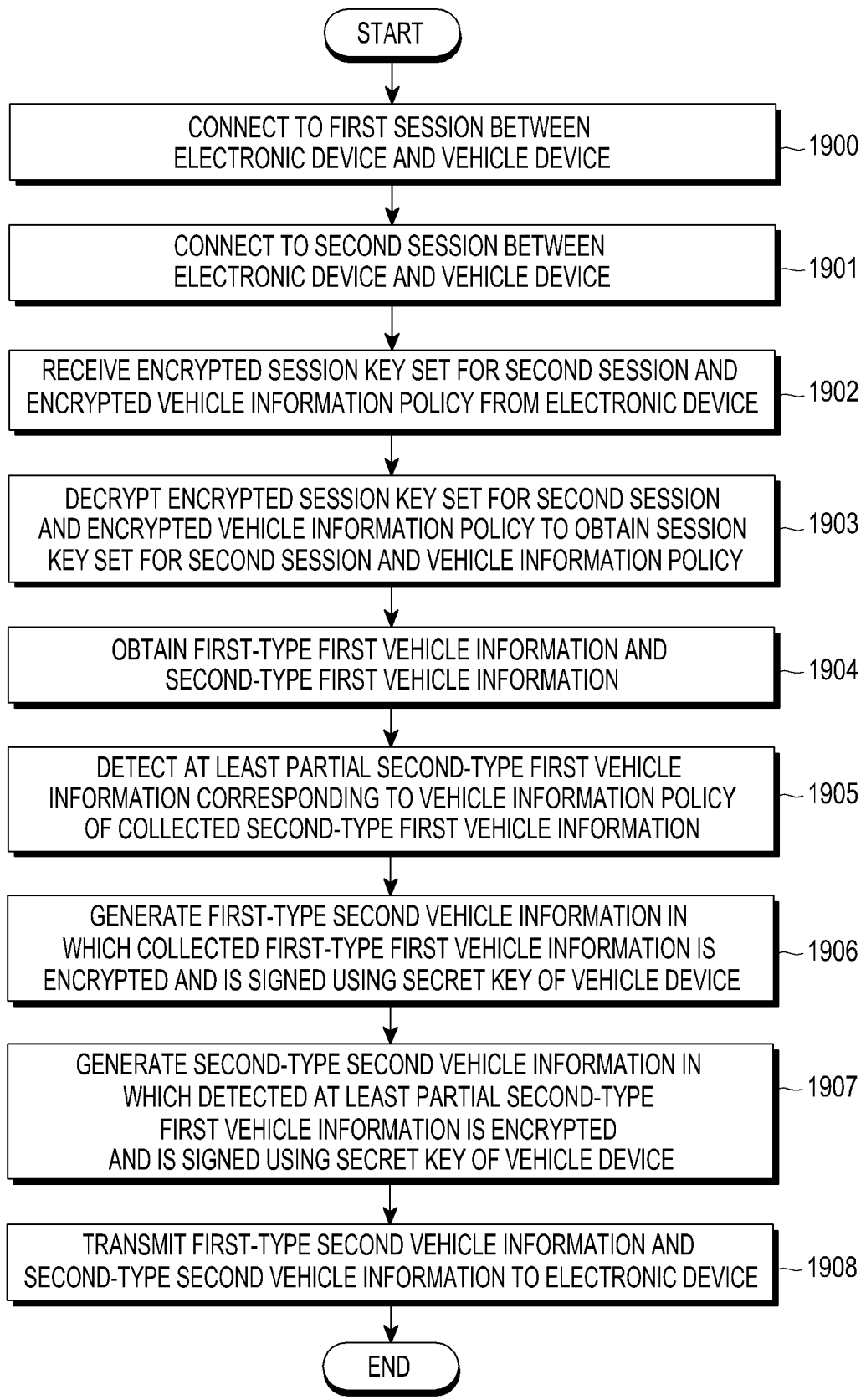
FIG. 19 is a flowchart illustrating an example method for providing vehicle information in a vehicle device according to various example embodiments of the present disclosure.

FIG. 19 is a flowchart illustrating an example method for providing vehicle information in a vehicle device according to various example embodiments of the present disclosure.

According to various embodiments, operations 1900 through 1908 may be executed by any one of the electronic device 101, 201, or 400, the first server 600, the processor 120, 210, 401, 501, or 601, the programming module 310, the vehicle device 500, the external device 700, the first external device 800, and the second external device 900.

Referring to FIG. 19, in operation 1900, the vehicle device 500 (e.g., the processor 501) is connected to the first session between the electronic device 400 and the vehicle device 500.

In operation 1901, the vehicle device 500 (e.g., the processor 501) is connected to the second session between the electronic device 400 and the vehicle device 500.

In operation 1902, the vehicle device 500 (e.g., the processor 501) receives the encrypted session key set for the second session and the encrypted vehicle information policy from the electronic device 400.

In operation 1903, the vehicle device 500 (e.g., the processor 501) decrypts the encrypted session key set for the second session and the encrypted vehicle information policy to obtain the session key set for the second session and the vehicle information policy.

In operation 1904, the vehicle device 500 (e.g., the processor 501) obtains the first-type first vehicle information and the second-type first vehicle information.

In operation 1905, the vehicle device 500 (e.g., the processor 501) detects at least partial second-type first vehicle information corresponding to the vehicle information policy of the obtained second-type first vehicle information.

In operation 1906, the vehicle device 500 (e.g., the processor 501) generates the first-type second vehicle information in which the obtained first-type first vehicle information is encrypted and is signed using the secret key of the vehicle device 500.

In operation 1907, the vehicle device 500 (e.g., the processor 501) generates the second-type second vehicle information in which the detected at least partial second-type first vehicle information is encrypted and is signed using the secret key of the vehicle device 500.

In operation 1908, the vehicle device 500 (e.g., the processor 501) transmits the first-type second vehicle information and the second-type second vehicle information to the electronic device 400.

Figure 20:
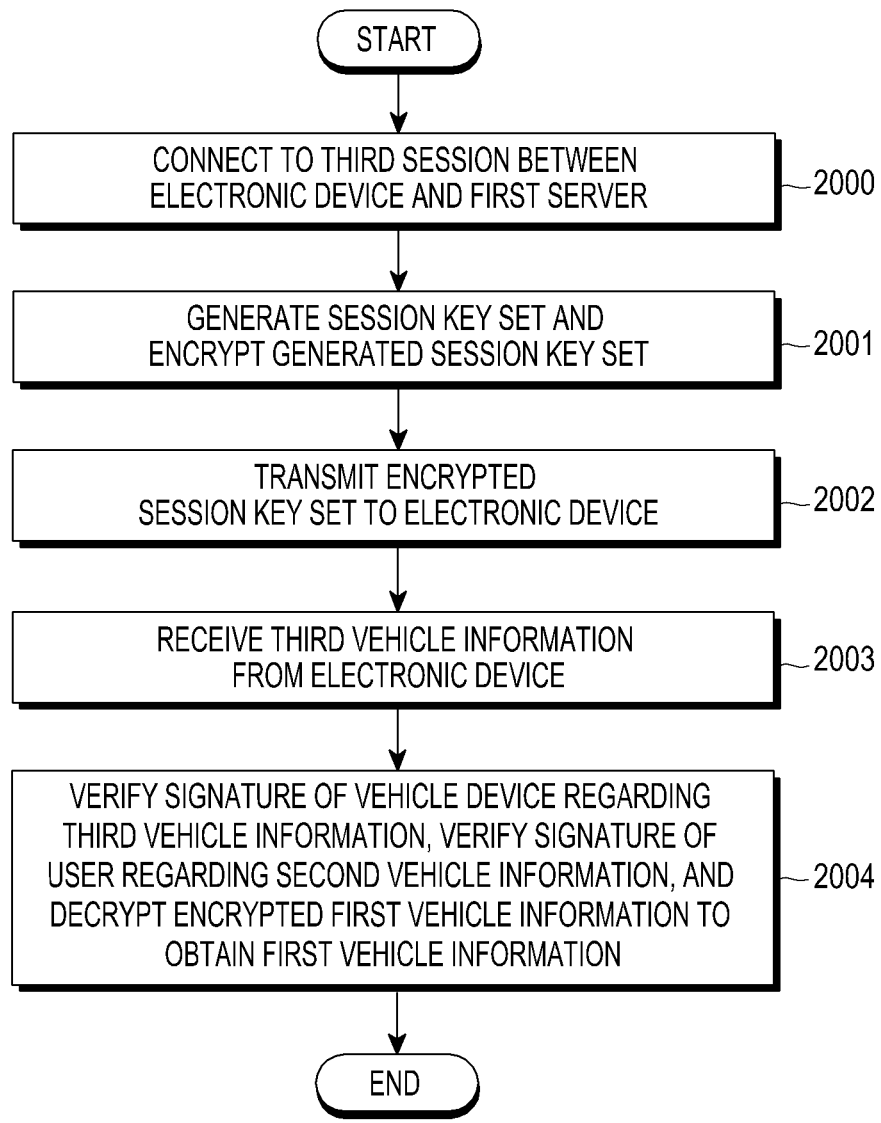
FIG. 20 is a flowchart illustrating an example method in which a first server is provided with vehicle information according to various example embodiments of the present disclosure.

FIG. 20 is a flowchart illustrating an example method in which a first server is provided with vehicle information according to various example embodiments of the present disclosure.

According to various embodiments, operations 2000 through 2004 may be executed by any one of the electronic device 101, 201, or 400, the first server 600, the processor 120, 210, 401, 501, or 601, the programming module 310, the vehicle device 500, the external device 700, the first external device 800, and the second external device 900.

Referring to FIG. 20, in operation 2000, the first server 600 (e.g., the processor 601) is connected to the third session between the electronic device 400 and the first server 600. For example, the first server 600 (e.g., the processor 601) may receive the user authentication certificate and the vehicle authentication certificate from the electronic device 400 and verify the user authentication certificate and the vehicle authentication certificate by using the public key of the first server 600.

In operation 2001, the first server 600 (e.g., the processor 601) generates the session key set and encrypts the generated session key set. According to an embodiment, the first server 600 (e.g., the processor 601) encrypts the generated session key set using the public key of the vehicle device 500. For example, the session key set may include the plurality of session keys for the session with the vehicle device 500 or the plurality of session keys for the second session with the electronic device 400.

In operation 2002, the first server 600 (e.g., the processor 601) transmits the encrypted session key set to the electronic device 400.

In operation 2003, the first server 600 (e.g., the processor 601) receives the third vehicle information from the electronic device 400. The third vehicle information may include the first vehicle information which is signed by the vehicle device 500 and the electronic device 400 and is encrypted by the vehicle device 500. According to an embodiment, the first server 600 (e.g., the processor 601) receives the third vehicle information in which the electronic device 400 signs, by using the secret key of the user, the second vehicle information in which the vehicle device 500 encrypts the first vehicle information of the vehicle device 500 using the public key (e.g., the first session public key) of the first session key of the session key set for the session with the vehicle device 500 and signs the first vehicle information using the secret key of the vehicle device 500.

In operation 2004, the first server 600 (e.g., the processor 601) verifies the signature of the vehicle device 500 for the third vehicle information, verifies the signature of the electronic device 400 for the second vehicle information, and decrypts the encrypted first vehicle information to obtain the first vehicle information. According to an embodiment, the first server 600 (e.g., the processor 601) may verify the signature of the vehicle device 500 using the public key of the vehicle device 500 and may verify the signature of the electronic device 400 using the public key of the electronic device 400. The first server 600 (e.g., the processor 601) decrypts the first vehicle information encrypted by the vehicle device 500 by using the secret key (e.g., the first session secret key) of the first session key for the session with the vehicle device 500 to obtain the first vehicle information.

Figure 21:
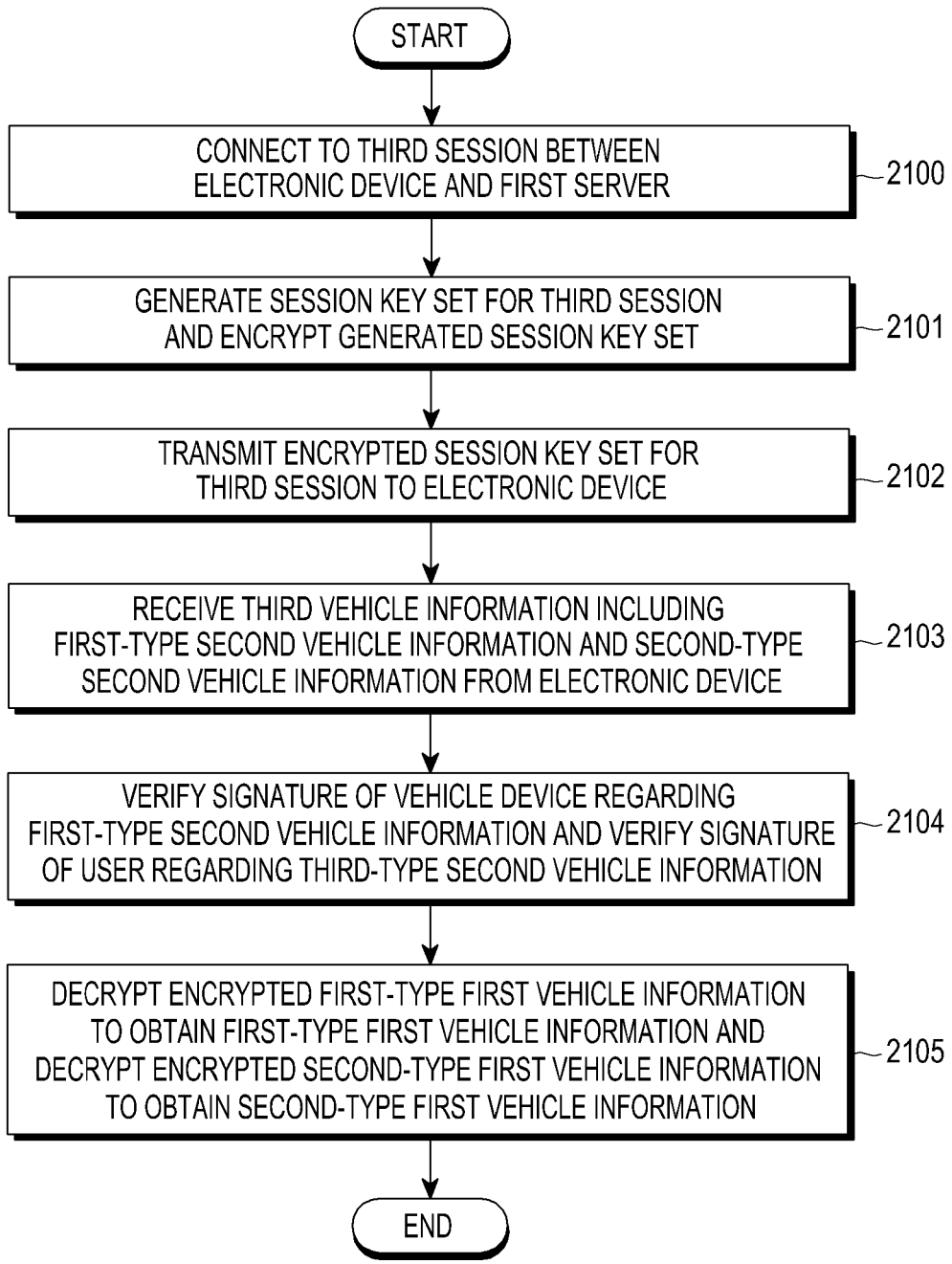
FIG. 21 is a flowchart illustrating an example method in which a first server is provided with vehicle information according to various example embodiments of the present disclosure.

FIG. 21 is a flowchart illustrating an example method in which a first server is provided with vehicle information according to various example embodiments of the present disclosure.

According to various embodiments, operations 2100 through 2105 may be executed by any one of the electronic device 101, 201, or 400, the first server 600, the processor 120, 210, 401, 501, or 601, the programming module 310, the vehicle device 500, the external device 700, the first external device 800, and the second external device 900.

Referring to FIG. 21, in operation 2100, the first server 600 (e.g., the processor 601) is connected to the third session between the electronic device 400 and the first server 600.

In operation 2101, the first server 600 (e.g., the processor 601) generates the session key set for the third session and encrypts the generated session key set.

In operation 2102, the first server 600 (e.g., the processor 601) transmits the encrypted session key set for the third session to the electronic device 400.

In operation 2103, the first server 600 (e.g., the processor 601) receives the third vehicle information including the first-type second vehicle information and the third-type second vehicle information from the electronic device 400.

In operation 2104, the first server 600 (e.g., the processor 601) verifies the signature of the vehicle device 500 regarding the first-type second vehicle information and verifies the user's signature regarding the third-type second vehicle information.

In operation 2105, the first server 600 (e.g., the processor 601) decrypts the encrypted first-type first vehicle information to obtain the first-type first vehicle information and decrypts the encrypted second-type first vehicle information to obtain the second-type first vehicle information.

Figure 22:
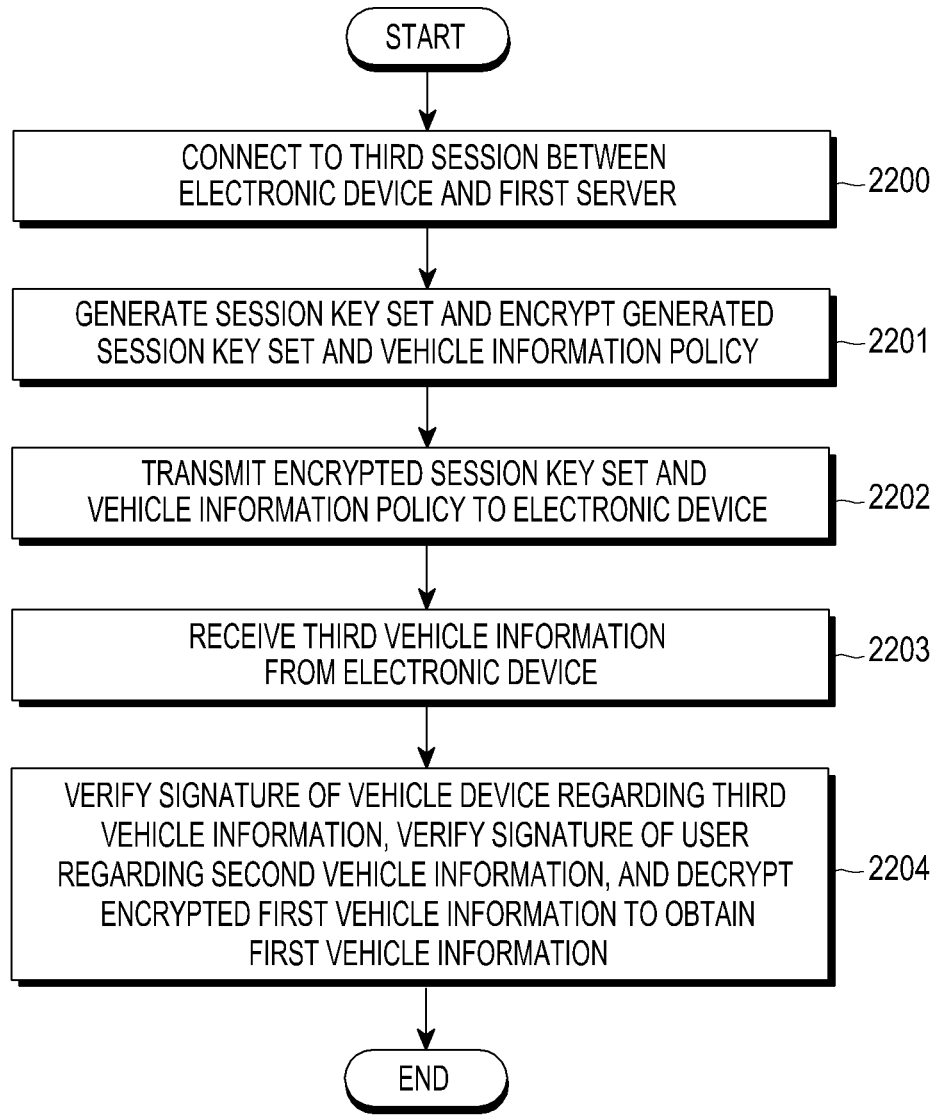
FIG. 22 is a flowchart illustrating an example method in which a first server is provided with vehicle information according to various example embodiments of the present disclosure.

FIG. 22 is a flowchart illustrating an example method in which a first server is provided with vehicle information according to various example embodiments of the present disclosure.

According to various embodiments, operations 2200 through 2204 may be executed by any one of the electronic device 101, 201, or 400, the first server 600, the processor 120, 210, 401, 501, or 601, the programming module 310, the vehicle device 500, the external device 700, the first external device 800, and the second external device 900.

Referring to FIG. 22, in operation 2200, the first server 600 (e.g., the processor 601) is connected to the third session between the electronic device 400 and the first server 600.

In operation 2201, the first server 600 (e.g., the processor 601) generates the session key set and encrypts the generated session key set and vehicle information policy.

In operation 2202, the first server 600 (e.g., the processor 601) transmits the encrypted session key set and vehicle information policy to the electronic device 400.

In operation 2203, the first server 600 (e.g., the processor 601) receives the third vehicle information from the electronic device 400.

In operation 2204, the first server 600 (e.g., the processor 601) verifies the signature of the vehicle device 500 regarding the third vehicle information, verifies the signature of the user regarding the second vehicle information, and decrypts the encrypted first vehicle information to obtain the first vehicle information. The obtained first vehicle information may include at least partial first vehicle information corresponding to the vehicle information policy of the first vehicle information obtained by the vehicle device 500.

Figure 23:
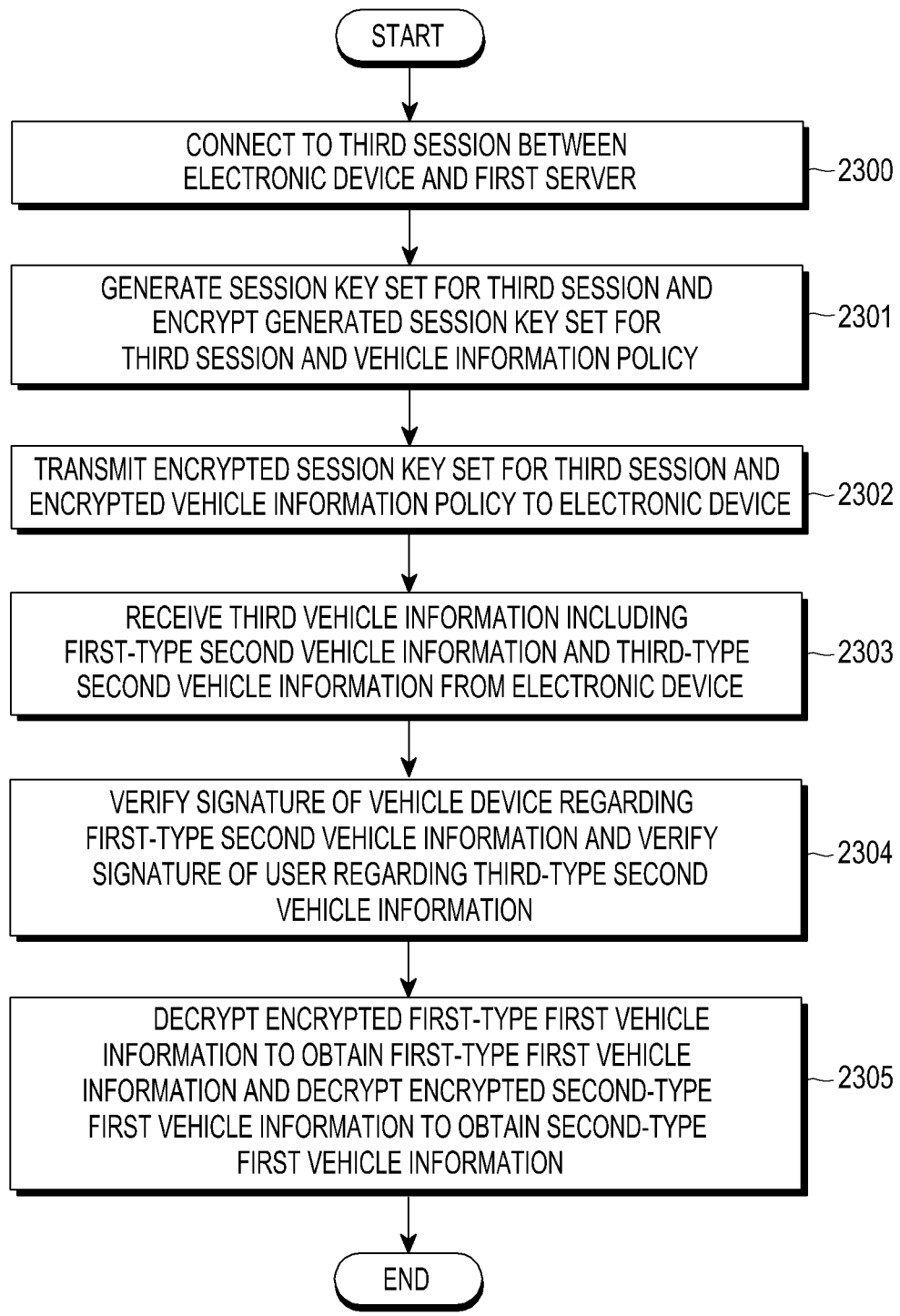
FIG. 23 is a flowchart illustrating an example method in which a first server is provided with vehicle information according to various example embodiments of the present disclosure.

FIG. 23 is a flowchart illustrating an example method in which a first server is provided with vehicle information according to various example embodiments of the present disclosure.

According to various embodiments, operations 2300 through 2305 may be executed by any one of the electronic device 101, 201, or 400, the first server 600, the processor 120, 210, 401, 501, or 601, the programming module 310, the vehicle device 500, the external device 700, the first external device 800, and the second external device 900.

Referring to FIG. 23, in operation 2300, the first server 600 (e.g., the processor 601) is connected to the third session between the electronic device 400 and the first server 600.

In operation 2301, the first server 600 (e.g., the processor 601) generates the session key set for the third session and encrypts the generated session key set for the third session and the vehicle information policy.

In operation 2302, the first server 600 (e.g., the processor 601) transmits the encrypted session key set for the third session and the encrypted vehicle information policy to the electronic device 400.

In operation 2303, the first server 600 (e.g., the processor 601) receives the third vehicle information including the first-type second vehicle information and the third-type second vehicle information from the electronic device 400.

In operation 2304, the first server 600 (e.g., the processor 601) verifies the signature of the vehicle device 500 regarding the first-type second vehicle information and verifies the user's signature regarding the third-type second vehicle information.

In operation 2305, the first server 600 (e.g., the processor 601) decrypts the encrypted first-type first vehicle information to obtain the first-type first vehicle information and decrypts the encrypted second-type first vehicle information to obtain the second-type first vehicle information. The obtained second-type second vehicle information may include at least partial second-type first vehicle information corresponding to the vehicle information policy of the second-type first vehicle information obtained by the vehicle device 500.

As is apparent from the foregoing description, according to various embodiments, the present disclosure authenticates the vehicle device, the electronic device, and the user and provides the encrypted vehicle information, thereby conveniently and safely providing the vehicle information for the user's vehicle.

A term "module" used herein may refer, for example, to a unit including one of or a combination of two or more of hardware, software, and firmware, and may be used interchangeably with terms such as logic, a logic block, a part, or a circuit. The "module" may be a part configured integrally, a minimum unit or a portion thereof performing one or more functions. The "module" may be implemented mechanically or electronically, and may include, for example, and without limitation, one or more of a dedicated processor, a CPU, an application-specific integrated circuit (ASIC) chip, field-programmable gate arrays (FPGAs), and a programmable-logic device performing certain operations already known or to be developed.

At least a part of an apparatus (e.g., modules or functions thereof) or a method (e.g., operations) according to various embodiments may be implemented with an instruction stored in a computer-readable storage medium (e.g., the memory 130) in the form of a programming module. When the instructions are executed by a processor (for example, the processor 120), the processor may perform functions corresponding to the instructions. The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), an embedded memory, and so forth. The instructions may include a code generated by a compiler or a code executable by an interpreter. Modules or programming modules according to various embodiments of the present disclosure may include one or more of the foregoing elements, have some of the foregoing elements omitted, or further include additional other elements. Operations performed by the modules, the programming modules or other elements according to various embodiments may be executed in a sequential, parallel, repetitive or heuristic manner, or at least some of the operations may be executed in different orders, and may be omitted, or other operations may be added.

While various example embodiments of the present disclosure have been described, various changes may be made without departing the scope of the present disclosure. Therefore, the scope of the present disclosure should be defined by the appended claims and equivalents thereof, rather than by the described embodiments.

What is claimed is:

1. An electronic device comprising:
   a communication circuitry configured to communicate with a vehicle device and a first server; and
   a processor electrically connected with the communication circuitry,
   wherein the processor is configured to:
   perform authentication with respect to a user of the electronic device using biometric information of the user;
   in response to the user of the electronic device being authenticated via the authentication, establish a first session with the first server;
   receive, through the first session, an encrypted session key set comprising at least one session key from the first server;
   transmit the encrypted session key set to the vehicle device;
   in response to transmitting the encrypted session key set to the vehicle device, receive, from the vehicle device, second vehicle information in which first vehicle information of the vehicle device is encrypted using a first session key of the at least one session key and is signed using a secret key of the vehicle device, wherein the first vehicle information includes driving information of the vehicle device; and
   transmit, to the first server, third vehicle information in which the received second vehicle information is signed using a secret key of the user.

2. The electronic device of claim 1, wherein the processor is further configured to receive an authentication certificate of the vehicle device from the vehicle device, to transmit an authentication certificate of the electronic device to the vehicle device, and to verify the received authentication certificate of the vehicle device using a public key of a second server.

3. The electronic device of claim 2, wherein the processor is further configured to generate a public key and a secret key for issuing an authentication certificate, to transmit the generated public key to the second server, and to receive, together with the public key of the second server, the authentication certificate of the electronic device signed using a secret key of the second server, from the second server.

4. The electronic device of claim 3, wherein the authentication certificate comprises at least one of: an extension identifier (ID), a vehicle ID, an electronic device ID, a first server ID, a user ID, a service ID, user driving information, service information, a service area, and country information.

5. A vehicle device comprising:
   a communication circuitry configured to communicate with an electronic device; and
   a processor electrically connected with the communication circuitry,
   wherein the processor is configured to:
   receive an encrypted session key set comprising at least one session key from the electronic device, wherein the encrypted session key set is received after a user of the electronic device is authenticated by the electronic device based on biometric information of the user;
   decrypt the encrypted session key set using a secret key of the vehicle device to obtain the session key set;
   obtain first vehicle information of the vehicle device, wherein the first vehicle information includes driving information of the vehicle device;
   encrypt the first vehicle information using a first session key of the at least one session key; and
   transmit, to the electronic device, second vehicle information in which the encrypted first vehicle information is signed using a secret key of the vehicle device.

6. The vehicle device of claim 5, wherein the processor is further configured to receive an authentication certificate of the electronic device from the electronic device and to verify the received authentication certificate of the electronic device using a public key of a second server.

7. The vehicle device of claim 5, wherein the processor is further configured to generate a public key and a secret key for issuing an authentication certificate, to transmit the generated public key to the second server, and to receive, together with the public key of the second server, the authentication certificate of the vehicle device signed using a secret key of the second server, from the second server.

8. The vehicle device of claim 7, wherein the authentication certificate comprises at least one of: an extension identifier (ID), a vehicle ID, an electronic device ID, a first server ID, a user ID, a service ID, user driving information, service information, a service area, and country information.

9. A first server comprising:
   a communication circuitry connected to an electronic device; and
   a processor electrically connected with the communication circuitry,
   wherein the processor is configured to:
   in response to a user of the electronic device being authenticated through authentication via biometric information of the user, establish a first session with the electronic device;
   generate a session key set comprising at least one session key for a session with a vehicle device;
   encrypt the generated session key set using a public key of the vehicle device;
   transmit, through the first session, the encrypted session key set to the electronic device;
   in response to transmitting the encrypted session key set to the electronic device, receive, from the electronic device, vehicle information encrypted using a first session key of the at least one session key by the vehicle device and signed by the vehicle device and the electronic device;
   verify a signature of the vehicle device using the public key of the vehicle device and verify a signature of the electronic device using a public key of the electronic device; and
   decrypt the encrypted vehicle information using the first session key to obtain the vehicle information, wherein the vehicle information includes driving information of the vehicle device.

10. A non-transitory storage medium having stored therein instructions which, when executed by at least one processor of an electronic device, cause the at least one processor to perform at least one operation comprising:
    performing authentication with respect to a user of the electronic device using biometric information of the user;
    in response to the user of the electronic device being authenticated via the authentication, establishing a first session with a first server;
    receiving, through the first session, an encrypted session key set comprising at least one session key from the first server;
    transmitting the encrypted session key set to the vehicle device;
    in response to transmitting the encrypted session key set to the vehicle device, receiving, from the vehicle device, second vehicle information in which first vehicle information of the vehicle device is encrypted using a first session key of the at least one session key and is signed using a secret key of the vehicle device, wherein the first vehicle information includes driving information of the vehicle device; and transmitting, to the first server, third vehicle information in which the received second vehicle information is signed using a secret key of the user.

11. The non-transitory computer-readable storage medium of claim 10, wherein the at least one operation further comprises:

receiving an authentication certificate of the vehicle device from the vehicle device;

transmitting an authentication certificate of the electronic device to the vehicle device; and verifying the received authentication certificate of the vehicle device using a public key of a second server.

12. The non-transitory computer-readable storage medium of claim 11, wherein the at least one operation further comprises:

generating a public key and a secret key for issuing an authentication certificate;

transmitting the generated public key to the second server; and receiving, together with a public key of the second server, an authentication certificate of the electronic device signed with a secret key of the second server, from the second server.

13. The non-transitory computer-readable storage medium of claim 12, wherein the authentication certificate comprises at least one of: an extension identifier (ID), a vehicle ID, an electronic device ID, a first server ID, a user ID, a service ID, user driving information, service information, a service area, and country information.

14. A non-transitory computer-readable storage medium having stored therein instructions which, when executed by at least one processor of a vehicle device, cause the at least one processor to perform at least one operation comprising:

receiving an encrypted session key set comprising at least one session key from an electronic device, wherein the encrypted session key set is received after a user of the electronic device is authenticated by the electronic device via biometric information of the user;

decrypting the encrypted session key set using a secret key of the vehicle device to obtain the session key set;

obtaining first vehicle information of the vehicle device, wherein the first vehicle information includes driving information of the vehicle device;

encrypting the first vehicle information using a first session key of the at least one session key; and transmitting, to the electronic device, second vehicle information in which the encrypted first vehicle information is signed using a secret key of the vehicle device.

15. The non-transitory computer-readable storage medium of claim 14, wherein the at least one operation further comprises:

receiving an authentication certificate of the electronic device from the electronic device; and verifying the received authentication certificate of the electronic device using a public key of a second server.

16. The non-transitory computer-readable storage medium of claim 14, wherein the at least one operation further comprises:

generating a public key and a secret key for issuing an authentication certificate;

transmitting the generated public key to the second server; and receiving, together with a public key of the second server, an authentication certificate of the vehicle device signed with a secret key of the second server, from the second server.

17. The non-transitory computer-readable storage medium of claim 16, wherein the authentication certificate comprises at least one of: an extension identifier (ID), a vehicle ID, an electronic device ID, a first server ID, a user ID, a service ID, user driving information, service information, a service area, and country information.

18. A non-transitory computer-readable storage medium having stored therein instructions which, when executed by at least one processor of a first server, cause the at least one processor to perform at least one operation comprising:

in response to a user of an electronic device being authenticated by authentication based on biometric information of the user, establishing a first session with the electronic device;

generating a session key set comprising at least one session key for a session with a vehicle device;

encrypting the generated session key set using a public key of the vehicle device; transmitting, through the first session, the encrypted session key set to the electronic device;

in response to transmitting the encrypted session key set to the electronic device, receiving, from the electronic device, vehicle information encrypted using a first session key of the at least one session key by the vehicle device and signed by the vehicle device and the electronic device;

verifying a signature of the vehicle device using the public key of the vehicle device and a signature of the electronic device using a public key of the electronic device; and decrypting the encrypted vehicle information using the first session key to obtain the vehicle information, wherein the vehicle information includes driving information of the vehicle device.

* * * * *